United States Patent
Kamada

(10) Patent No.: US 9,139,747 B2
(45) Date of Patent: Sep. 22, 2015

(54) IMAGE FORMING METHOD

(71) Applicant: FUJIFILM CORPORATION, Toyko (JP)

(72) Inventor: Toshihiro Kamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 191 days.

(21) Appl. No.: 13/771,932

(22) Filed: Feb. 20, 2013

(65) Prior Publication Data

US 2013/0222501 A1 Aug. 29, 2013

(30) Foreign Application Priority Data

Feb. 24, 2012 (JP) ................................. 2012-039232
Dec. 28, 2012 (JP) ................................. 2012-287915

(51) Int. Cl.
*C09D 11/30* (2014.01)
*B41J 2/21* (2006.01)
*B41J 11/00* (2006.01)
*C09D 11/101* (2014.01)
*C09D 11/322* (2014.01)
*C09D 11/54* (2014.01)

(52) U.S. Cl.
CPC ............... *C09D 11/30* (2013.01); *B41J 2/2114* (2013.01); *B41J 11/002* (2013.01); *C09D 11/101* (2013.01); *C09D 11/322* (2013.01); *C09D 11/54* (2013.01)

(58) Field of Classification Search
CPC ............. B41J 2/01; B41J 2/17; B41J 2/2107; B41J 11/0015; B41J 11/002; B41J 2/2114; C09D 11/30; C09D 11/322; C09D 11/38; C09D 11/40; C09D 11/54; C09D 11/101; C09D 11/005; C09D 11/36; C09D 11/03; C09D 11/1018

USPC ............. 347/95–105; 106/31.6, 31.13, 31.27, 106/31.85

See application file for complete search history.

(56) References Cited

U.S. PATENT DOCUMENTS

2010/0075052 A1   3/2010   Irita
2011/0043578 A1   2/2011   Tojo
(Continued)

FOREIGN PATENT DOCUMENTS

| JP | 2004-209976 A | 7/2004 |
| JP | 2005-307198 A | 11/2005 |
| JP | 2008-100511 A | 5/2008 |
| JP | 2010-070693 A | 4/2010 |

(Continued)

OTHER PUBLICATIONS

An Office Action; "Notice of Reasons for Rejection," issued by the Japanese Patent Office on Jan. 21, 2014, which corresponds to Japanese Patent Application No. 2012-287915 and is related to U.S. Appl. No. 13/771,932; with English language translation.

Primary Examiner — Matthew Luu
Assistant Examiner — Rut Patel
(74) Attorney, Agent, or Firm — Studebaker & Brackett PC

(57) ABSTRACT

An image forming method has applying an ink composition winch includes: at least a pigment, water, and polyvalent (meth)acrylamide of 3.0 mass % or more and 15.0 mass % or less with respect to the entire ink composition as a polymerizable compound, to a coated paper having a pigment layer on at least one surface of a support in which cellulose pulp is a main component, using an ink jet method; at least drying the applied ink composition; and curing the ink composition on the coated paper by irradiating active energy rays at an illuminance of 1 W/cm$^2$ or more and 2 W/cm$^2$ or less to the ink composition which has undergone drying processing.

20 Claims, 1 Drawing Sheet

(56) References Cited

U.S. PATENT DOCUMENTS

2011/0211012 A1\* 9/2011 Irita .............................. 347/20
2011/0211014 A1   9/2011 Irita
2013/0222501 A1\* 8/2013 Kamada ..................... 347/102
2013/0229291 A1\* 9/2013 Kaeriyama et al. ............ 341/21

FOREIGN PATENT DOCUMENTS

| JP | 2011-042150 A | 3/2011 |
| JP | 2011-178033 A | 9/2011 |
| JP | 2012-012443 A | 1/2012 |

\* cited by examiner

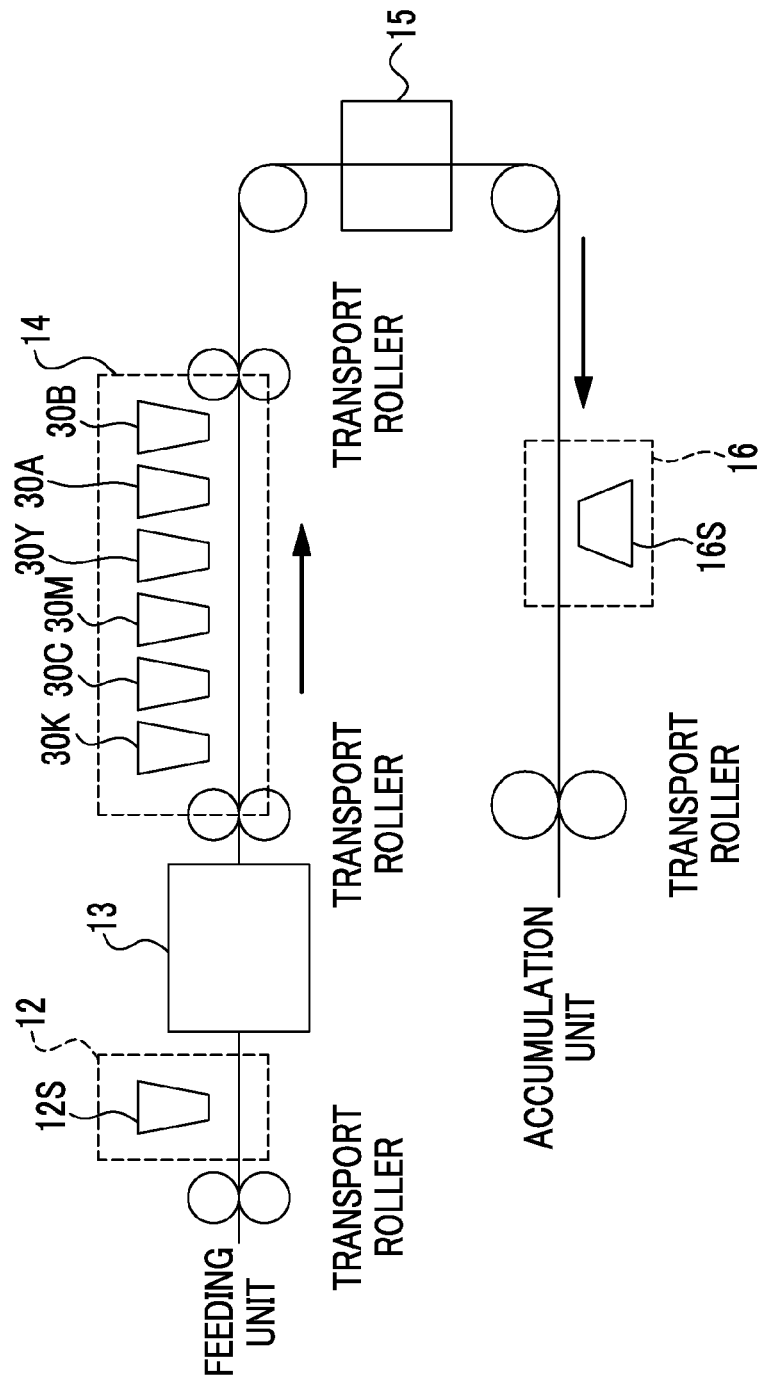

IMAGE FORMING METHOD

BACKGROUND OF THE INVENTION

1. Field of the Invention

The present invention relates to an image forming method using an inkjet method.

2. Description of the Related Art

In recent years, regarding methods of recording images, there is a demand for obtaining high-quality images in a wide variety of common situations no matter which method is used. For example, in ink jet techniques, there is an image recording method which is widely anticipated in the fields such as office printers, home printers and the like and in the commercial field since the desired image forming on various target recording mediums can be performed.

As ink which is used in ink jet recording, other than solvent type ink, from the point of considering the global environment or business environment, water type inks have gained attention. Even among such water type inks, a technique is being examined where a highly scratch resistant image is formed due to curing by including a polymerizable monomer component in a water-based pigment ink. As one such image forming technique, for example, an ink jet recording method is disclosed where ultra violet rays (UV) are irradiated for a predetermined time period after ink is landed on a substrate, using an ultra violet curable ink which contains coloring material, ultra violet polymerizable material, and a photoinitiator in an aqueous medium (for example, refer to JP2004-209976A).

In addition, as the method of curing by including a polymerizable monomer component, there is a technique where the monomer component is thermal polymerized. For example, an ink jet recording method is disclosed where heating is performed after printing using ink on recording media where a pigment layer is coated onto a support in which cellulose pulp is a main component (for example, refer to JP2008-100511A and JP2011-42150A).

Among techniques in the related art described above, in a method of performing ultra violet ray irradiation for a predetermined time after ink landing, film properties (scratch resistance, water resistance) and suppression of paper deformation (curl) are increased by exposure before the ink is absorbed in the paper, but it is difficult to obtain a desired curing sensitivity. That is, with regard to water-based inks of a UV curing type, it is understood that appropriate drying is important for obtaining excellent exposure sensitivity, and sufficient sensitivity cannot be obtained with exposure immediately after ink landing as described above. Moreover, in UV irradiation immediately after ink landing, the setting positions of a UV light source and a discharge head become closer, ink in the vicinity of a discharge hole is cured by light leakage from the UV light source, and as a result, this is a cause of damage to the head. Therefore, the risk in terms of the system is extremely high.

In addition, in a thermal curing method, since water derived from the ink or a water-soluble organic solvent largely remains in a pigment layer (that is, a coated layer of a coated paper) after printing, the strength of the pigment layer is remarkably easily decreased, and not only does the layer itself weaken, but the adhesion of the image and the strength of the image itself become problems. In this method, since the aqueous medium is volatized or diffused into the pulp by the recording media being left for a time after the image forming and the remaining amount of water or solvent in the coated layer is reduced, the reduction and the like in the strength of the pigment layer is alleviated; however, this requires being left for a time of one day or more. Processing or the like cannot be carried out immediately after printing in practice.

In addition, when recording an image, there is a demand that various types of unevenness not be generated. In particular, in terms of the external appearance, gloss unevenness which is made to stand out by the reflection of light is a cause of a remarkable decrease in product quality. For the improvement of such gloss unevenness, generally, it is advantageous when the curing speed during the curing is faster; however, for this reason, it is essential to promote the curing by imparting a certain degree of illuminance. Therefore, it is desirable to provide a curing system in which the curing of the image proceeds rapidly even at a low illuminance and in which gloss unevenness is not easily generated, and the technical significance of the provision of such a curing system is great.

SUMMARY OF THE INVENTION

The present invention has been made in consideration of the above and has an object of providing an image forming method in which an image is formed with excellent adhesion (curing sensitivity) and with little gloss unevenness at a low illuminance, using an active energy ray-curable water-based ink on a coated paper which is provided with a pigment layer and in which penetration of the liquid is comparatively mild, and the subject thereof is to achieve this object.

It was found that, in image formation using an active energy ray-curable water-based ink, a particular monomer compound in which the degree of drying during curing or the curing speed easily influences unevenness (in particular, clouded uneven reflection) in the formed image and in which a polymerization reaction proceeds comparatively quickly is useful for increasing the adhesion without deteriorating the gloss unevenness even at a low illuminance of 2 W or less, and the present invention was completed based on this finding.

Specific means for achieving the subject are as follows.

<1> An image forming method including: applying an ink composition, which includes at least a pigment, water, and polyvalent (meth)acrylamide of 3 mass % or more and 15 mass % or less with respect to the entire ink composition as a polymerizable compound, to a coated paper having a pigment layer on at least one surface of a support in which cellulose pulp is a main component, using an ink jet method; at least drying the applied ink composition; and curing the ink composition on the coated paper by irradiating active energy rays at an illuminance of 1 $W/cm^2$ or more and 2 $W/cm^2$ or less to the ink composition which has undergone drying processing.

<2> The image forming method according to <1>, in which the polyvalent (meth)acrylamide is a compound represented by the following General Formula (1). In General Formula (1), Q represents an n-valent linking group, and $R^1$ represents a hydrogen atom or a methyl group. n is an integer of two or more.

[Chem. 1]

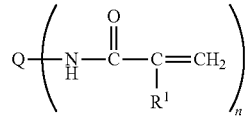

General Formula (1)

<3> The image forming method according to <1> or <2>, in which a total amount of the polymerizable compound including the polyvalent (meth)acrylamide with respect to a total amount of the composition is 10% or more and 50% or less by mass ratio.

<4> The image forming method according to any one of <1> to <3>, in which the pigment is a water-dispersible pigment where at least a part of a surface thereof is coated with a polymeric dispersing agent.

<5> The image forming method according to any one of <1> to <4>, in which the polyvalent (meth)acrylamide is a trivalent or higher (meth)acrylamide.

<6> The image forming method according to any one of <1> to <5>, further including: applying a treatment liquid, which includes an aggregation component capable of aggregating components in the ink composition, to the coated paper, prior to drying processing.

<7> The image forming method according to <6>, in which at least one of the ink composition and the treatment liquid further includes a polymerization initiator.

<8> The image forming method according to <7>, in which at least one type of the polymerization initiator is 1-[4-(2-hydroxyethoxy)-phenyl]-2-hydroxy-2-methyl-1-propan-1-one.

<9> The image forming method according to any one of <1> to <8>, in which the ink composition includes polymer particles, and a content of the polymer particles in the ink composition is 1 mass % or more and 3 mass % or less by solid content concentration.

<10> The image forming method according to any one of <1> to <9>, in which the ink composition is applied to the coat paper with a maximum application amount of 15 ml/m$^2$ or less.

<11> The image forming method according to any one of <1> to <10>, in which the ink composition further includes a surfactant.

The present invention provides an image forming method in which an image is formed with excellent adhesion (curing sensitivity) and with little gloss unevenness at a low illuminance, using an active energy ray-curable water-based ink on coated paper which is provided with a pigment layer and in which penetration of the liquid is comparatively mild.

BRIEF DESCRIPTION OF THE DRAWINGS

FIG. 1 is a schematic configuration diagram illustrating an example of a configuration of an ink jet recording apparatus used in an implementation of the image forming method of the present invention.

DESCRIPTION OF THE PREFERRED EMBODIMENTS

Below, an image forming method of a present invention will be described in detail.

The image forming method of the present invention is provided with: an ink application step of applying an ink composition including at least a pigment, water, and polyvalent (meth)acrylamide (polymerizable compound) to a coated paper having a pigment layer on at least one surface of a support in which cellulose pulp is a main component, using an ink jet method; at least a drying step of drying the applied ink composition; and a curing step of curing the ink composition on the coated paper by irradiating active energy rays at an illuminance of 1 W/cm$^2$ or more and 2 W/cm$^2$ or less to the ink composition which has undergone the drying step, in which the content ratio of the polyvalent (meth)acrylamide included in the ink composition used in the ink application step is configured as 3% or more and 15% or less with respect to the total amount of the ink composition based on mass.

In addition, as required, the image forming method of the present invention may further be configured to be provided with other steps such as a treatment liquid application step of applying a treatment liquid forming an aggregate body when in contact with the ink composition.

In the present invention, during image forming on a recording medium (coated paper) having a pigment layer in which the transfer of water or organic solvent in the ink is comparatively mild, polyvalent (meth)acrylamide is included in a range of a predetermined amount as a polymerizable compound and a curing reaction is performed at a predetermined illuminance after drying the ink composition in advance before the UV curing and after the image forming. On the premise that since it is understood that the curing reaction does not easily proceed in a state prior to the ink drying, the UV irradiation is performed after the drying, the illuminance is adjusted in a range in which the uniformity of the curing reaction of the entire image is preserved while establishing a polymerization curing system of a constant speed or higher by including a predetermined amount of polyvalent (meth)acrylamide in which the curing reaction proceeds comparatively easily. In other words, the curing reaction of the curing system in which curing proceeds easily proceeds uniformly even at a low illuminance of 2 W or less. In this manner, even when the curing reaction is performed at a low illuminance, the adhesion of the image is increased while eliminating the gloss unevenness in the image. In particular, the present invention is effective in cases where the content of the polymer particles in the ink is low and an image is formed by aggregating components in the ink using a treatment liquid. The aggregation system using the treatment liquid is also effective in the point of preventing line unevenness which is easily generated in the image due to the occurrence of non-uniformity in the aggregation components.

That is, in contrast with the related art, by performing active energy ray (for example, ultraviolet ray) irradiation with respect to the image after drying rather than performing UV irradiation immediately after ink landing as in the related art, a distinction is made with respect to the method of the related art in the point that the uniformity of the curing reaction in the entire image is set preserved to be higher.

In addition, for example, when the ink composition is landed on the coated paper (example: the coated paper), while there is a penetration delay effect suppressing the penetration of the water or the like into the cellulose pulp in the coated layer, since water and aqueous organic solvent in the ink penetrate into the coated layer and the polymerizable compound also penetrates thereinto at the same time, the image is cured together with the coating layer, and, in comparison with the related art, an image having superior adhesion to the recording medium and scratch resistance is formed.

Recording Medium

First, the recording medium in the present invention will be described in detail.

In the present invention, as the recording medium on which the image is formed, the coated paper having a pigment layer on at least one surface of a support in which cellulose pulp is a main component is used. For example, the coated paper used in general offset printing or the like is provided with a coating layer by coating a coating material including a pigment on the surface of high-quality paper, neutral paper, or the like which is mainly composed of cellulose and generally not surface processed. In the image forming according to aqueous ink jetting which generally uses the coated paper as the recording medium, problems easily occur in terms of product quality such as gloss unevenness or abrasion resistance; however, in the image forming method of the present invention, the generation of gloss unevenness is prevented and an image having good abrasion resistance is obtained.

The coated paper is an example of the recording medium having one layer or a plurality of layers of pigment layers on at least one surface of the support in which cellulose pulp is a main component, and in which the transfer amount of pure water measured by a dynamic scanning absorptometer is 1 ml/m$^2$ or more and 15 ml/m$^2$ or less at a contact time of 100 ms and is 2 ml/m$^2$ or more and 20 ml/m$^2$ or less at a contact time of 400 ms.

Support

As the support in the present invention in which cellulose pulp is a main component, one may be used in which a raw material, which uses a mix of chemical pulp, mechanical pulp, pulp of old recycled paper, or the like in an arbitrary ratio and to which an internal sizing agent, a yield improving agent, a paper strengthening agent, and the like are added as required, is made into paper in a Fourdrinier former, a gap type of twin wire former, a hybrid former where the latter half portion of the Fourdrinier portion is configured using a twin wire, or the like. Here, the "main component" refers to a component included as 50 mass % or more with respect to the mass of the support.

For the details of the pulp used in the support, reference can be made to the description in paragraph number [0024] in JP2011-42150A. In addition, in the support, a filler, an internal sizing agent, or the like can be used. For the details of fillers, internal sizing agents, and the like, reference can be made to the description in paragraph numbers [0025] to [0027] in JP2011-42150A.

Pigment Layer

The coated paper in the present invention has one layer or a plurality of pigment layers on at least one surface of the support.

The type of pigment used in the pigment layer is not particularly limited and an organic pigment or inorganic pigment known in the related art can be used. For specific examples of the pigments, reference can be made to the description of paragraph number [0029] of JP2011-42150A, and, from the point of improving the image density by maintaining the transparency of the recording medium, a white inorganic pigment is preferable.

The pigment layer can further contain additives such as an aqueous binder, an anti-oxidant, a surfactant, a defoaming agent, a foam preventing agent, a pH adjusting agent, a curing agent, a colorant, a fluorescent whitening agent, a preservative, and a waterproofing agent. For more details of aqueous binders, reference can be made to the description of paragraph number [0030] of JP2011-42150A.

A method for forming the pigment layer on the support can be appropriately selected according to the purpose thereof without being particularly limited. For example, the pigment layer can be formed by coating and drying a dispersion solution, in which the pigment is dispersed in water, on the paper. The amount of pigment in the pigment layer is preferably 0.1 g/m$^2$ to 20 g/m$^2$. By the amount of the pigment being 0.1 g/m$^2$ or more, the blocking resistance is improved, and by being 20 g/m$^2$ or less, there is an advantage in terms of being less brittle. The pigment included in the pigment layer is preferably 10 mass % or more with respect to solid content of the layer, and more preferably 14 mass % or more.

For the coated paper, the transfer amount of pure water into the coated paper measured by a dynamic scanning absorptometer is preferably 1 ml/m$^2$ or more and 15 ml/m$^2$ or less at a contact time of 100 ms and 2 ml/m$^2$ or more and 20 ml/m$^2$ or less at a contact time of 400 ms. That is, in the present invention, an image can be formed in which the generation of gloss unevenness is suppressed on a recording medium in which the ink absorption amount is comparatively low with the transfer amount in this range. Here, in relation to the transfer amount, 1 ml/m$^2$ or more at a contact time of 100 ms and 2 ml/m$^2$ or more at a contact time of 400 ms indicates that the recording medium having a slow absorption rate has the pigment layer which is able to absorb ink. In addition, 15 ml/m$^2$ or less at a contact time of 100 ms and 20 ml/m$^2$ or less at a contact time of 400 ms indicates that the ink absorption amount is comparatively small. That is, that "the transfer amount of pure water into the recording medium which has been measured by a dynamic scanning absorptometer" is in the range described above has the meaning that the amount of permeation of the ink is small due to the recording medium having the pigment layer.

Here, the dynamic scanning absorptometer (DSA, Japan TAPPI Journal, Volume 48, May 1994, pages 88 to 92, Shigenori Kuga) is an apparatus that is able to accurately measure the absorption amount of a liquid in a very short period of time. The dynamic scanning absorptometer performs measurements automatically using a method including reading the rate of liquid absorption directly from the movement of the meniscus in a capillary tube, using a sample in the shape of a disk, scanning the liquid absorption head thereon in the shape of a spiral, automatically changing the scanning speed according to a pattern which is set in advance, and measuring only the required number of points with a single sample. The liquid supply head for a paper sample is connected to a capillary tube via a Teflon (registered trademark) tube and the position of the meniscus within the capillary tube is read automatically with an optical sensor. Specifically, the amount of transfer of pure water or ink is measured using a dynamic scanning absorptometer (Model K350 Series D, Kyowa Co., Ltd.). The transfer amount can be determined at contact times of 100 ms and 400 ms by interpolating from a measured value of the transfer amount at a contact time approximating each contact time. The measurement is carried out at 23° C. and 50% RH.

In the present invention, the amount of transfer of pure water to the recording medium at a contact time of 100 ms which is measured using the dynamic scanning absorptometer is preferably 1 ml/m$^2$ to 15 ml/m$^2$, more preferably 1 ml/m$^2$ to 10 ml/m$^2$, and even more preferably 1 ml/m$^2$ to 8 ml/m$^2$. When the amount of transfer of pure water at a contact time of 100 ms is too small, it is easy for beading to occur. In addition, when the transfer amount exceeds 15 ml/m$^2$ and is too large, there are cases where the diameter of the ink dots after recording is smaller than the desired diameter.

Here, beading is a phenomenon where concentration unevenness can occur due to the coloring material in the ink becoming lumps in portions due to certain ink droplets remaining on the surface of the recording medium in a liquid state without having been completely absorbed into the inner portion of the recording medium in the time between landing on the recording medium until the next ink droplet lands on the recording medium and by the subsequent mixing of the landed ink droplets during ink jet recording.

In the present invention, the amount of transfer of pure water to the recording medium at a contact time of 400 ms which is measured using the dynamic scanning absorptometer is preferably 2 ml/m$^2$ to 20 ml/m$^2$, more preferably 2 ml/m$^2$ to 15 ml/m$^2$, and even more preferably 2 ml/m$^2$ to 10 ml/m$^2$. When the amount of transfer at a contact time of 400 ms is too small, it is easy for a trace of a spur to occur since drying is insufficient. In addition, when the transfer amount exceeds 20 ml/m² and is too large, it is easy for bleeding to occur and it is easy for the glossiness of the image portion after drying to be lowered.

The pigment layer is configured to have the pigment and a resin binder as the main components. Respective adjustments can be performed in a direction reducing the transfer amount by increasing the blending amount of the resin and in a direction increasing the transfer amount by increasing the blending amount of the pigment. In addition, the transfer amount can be increased even when various types of pigments having a large specific surface area are used by increasing the specific surface area of the pigment particles which configure the pigment layer, for example, reducing the particle diameter.

Preferable examples of the coated paper include coated paper, lightweight coated paper, or fine coated paper, and those generally available on the market can be acquired and used. As examples of the coated paper, general coated paper for printing can be used and specific examples of A2 gloss paper may include "OK Top Coat+" (manufactured by Oji Paper Co., Ltd.), "Aurora Coat" (manufactured by Nippon Paper Industries Co., Ltd.), "Pearl Coat" (manufactured by Mitsubishi Paper Mills Ltd.), S Utoriro Coat (manufactured by Daio Paper Corporation), "Mu Coat Neos" (manufactured by Hokuetsu Paper Mills, Ltd.), and "Raicho Coat" (manufactured by Chuetsu Pulp & Paper Co., Ltd.), examples of A2 mat paper may include "New Age" (manufactured by Oji Paper Co., Ltd.), "OK Top Coat Mat" (manufactured by Oji Paper Co., Ltd.), "U Lite" (manufactured by Nippon Paper Industries Co., Ltd.), "New V Mat" (manufactured by Mitsubishi Paper Mills Ltd.), and "Raicho Mat Coat N" (manufactured by Chuetsu Pulp & Paper Co., Ltd.), examples of A1 gloss art paper may include "OK Kanefuji+" (manufactured by Oji Paper Co., Ltd.), "Tokumitsu Art" (manufactured by Mitsubishi Paper Mills Ltd.), and "Raicho Toku Art" (manufactured by Chuetsu Pulp & Paper Co., Ltd.), examples of A1 dull art paper may include "Saten Kanefuji+" (manufactured by Oji Paper Co., Ltd.), "Super Mat Art" (manufactured by Mitsubishi Paper Mills Ltd.), and "Raicho Dull Art" (manufactured by Chuetsu Pulp & Paper Co., Ltd.), and examples of AO art paper may include "SA Kanefuji+" (manufactured by Oji Paper Co., Ltd.), "Superior Art" (manufactured by Mitsubishi Paper Mills Ltd.), "Raicho Super Art N" (manufactured by Chuetsu Pulp & Paper Co., Ltd.), "Ultra Saten Kanefuji₊" (manufactured by Oji Paper Co., Ltd.), and "Diamond Premium Dull Art" (manufactured by Mitsubishi Paper Mills Ltd.).

Ink Application Step

The ink application step in the present invention forms an image by applying an ink composition, which includes at least a pigment, water, and polyvalent (meth)acrylamide of 3 mass % or more and 15 mass % or less with respect to the entire ink composition as a polymerizable compound, to the coated paper having a pigment layer on at least one surface of a support in which cellulose pulp is a main component, using an ink jet method.

The image recording using the ink jet method discharges the ink composition in liquid droplet form on the coated paper by being supplied with energy and forms an image. Here, as the inkjet method, the method described in paragraph numbers [0093] to [0105] of JP2003-306623A can be preferably applied.

The ink jet method is not particularly limited and may be a known method, for example, any of a charge control method where ink is discharged using static induction, a drop on demand method (pressure pulse method) which uses vibration pressure of a piezo element, an acoustic ink jet method where ink is discharged using radiation pressure by changing an electric signal into an acoustic beam and irradiating the ink, a thermal ink jet method where bubbles are formed by heating the ink and pressure which is generated is used, or the like. As the ink jet method, in particular, with the method described in JP1979-59936A (JP-S54-59936A), an ink jet method of causing a sudden change in the volume of ink that receives the effect of thermal energy and discharging the ink from nozzles by the acting force due to the change in state can be used effectively.

Here, the ink jet methods include a method of ejecting many ink dots with low density known as photo ink at small volumes, a method of improving image quality using a plurality of inks with substantially the same color phase and different densities, and a method of using a colorless, transparent ink.

In addition, in the ink application step, images can be formed by, for example, changing the transport speed of the recording medium. The transport speed is not particularly limited if within a range where the image quality does not deteriorate and is preferably 100 to 3000 mm/s, more preferably 150 to 2700 mm/s, and even more preferably 250 to 2500 mm/s.

In the present invention, it is preferable that the maximum application amount of the ink composition to the recording medium be 15 ml/m² or less. As a result of the maximum application amount being 15 ml/m² or less, adhesion to the image is superior. Furthermore, as the maximum application amount, 8 to 15 ml/m² is preferable from the point of view of density and adhesion to the image. The maximum application amount can be controlled by adjusting the ejection method from the ejection nozzles.

Ink Composition

The ink composition of the present invention is a water-based ink composition including water as a medium, and is specifically configured to include a pigment, water, and polyvalent (meth)acrylamide as a polymerizable compound with the content of the polyvalent (meth)acrylamide being 3 mass % or more and 15 mass % or less with respect to the entire ink composition. As necessary, the ink composition may be configured to further use resin particles, water-soluble organic solvents, and other components such as surfactants or lubricating agents.

The ink composition is used as an ink for ink jet recording and is able to be used in the recording of color images. For example, in a case where a full color image is formed, it is preferable to use a magenta color tone ink, a cyan color tone ink, and a yellow color tone ink, and in addition, a black color tone ink may be further used to adjust the color tones. In addition, other than yellow, magenta, and cyan color tone inks, red, green, blue, and white inks and so-called specialized color inks in the printing field can be used.

Pigment

The ink composition of the present invention contains at least one type of pigment. The pigment is not particularly limited and can be appropriately selected according to the purpose, for example, the pigment may be either an organic pigment or an inorganic pigment. It is preferable that the pigment be a pigment which is almost insoluble or sparingly soluble in water from the viewpoint of the ink colorability.

Examples of the organic pigments include azo pigments, polycyclic pigments, chelate dyes, nitro pigments, nitroso pigments, aniline black, and the like. Among these, azo pigments, polycyclic pigments, and the like are more preferable. Examples of the inorganic pigments include titanium oxide, iron oxide, calcium carbonate, barium sulfate, aluminum hydroxide, barium yellow, cadmium red, chrome yellow, carbon black, and the like. Even among these, carbon black is particularly preferable.

In a case where an organic pigment is used, in regard to the average particle diameter of the organic pigment, smaller is good from the viewpoint of transparency and color reproduction and larger is preferable from the viewpoint of resistance to light. From the point of view of achieving both of these, an average particle diameter of 10 to 200 nm is preferable, 10 to 150 nm is more preferable, and 10 to 120 nm is even more preferable. In addition, the particle size distribution of the organic pigment is not particularly limited and any of a pigment with a wide particle size distribution or a pigment with a monodispersed particle size distribution is sufficient. In addition, two or more types of organic pigments having a monodispersed particle size distribution may be mixed and used.

Dispersing Agent

The ink composition of the present invention can contain at least one kind of dispersing agent. As the dispersing agent of the pigment, any of a polymeric dispersing agent or a surfactant-type dispersing agent with a low molecular weight is sufficient. In addition, as the polymeric dispersing agent, any of a water-soluble dispersing agent or a water-insoluble dispersing agent is sufficient.

The surfactant-type dispersing agent with a low molecular weight is able to stably disperse the pigment in the water solvent while maintaining the ink at a low viscosity. The surfactant-type dispersing agent with a low molecular weight is a low molecular weight dispersing agent with a molecular weight of 2,000 or less. In addition, the molecular weight of the surfactant-type dispersing agent with a low molecular weight is preferably 100 to 2,000 and more preferably 200 to 2,000.

The surfactant-type dispersing agent with a low molecular weight has a structure which includes a hydrophilic group and a hydrophobic group. In addition, it is sufficient if one or more of the hydrophilic group and the hydrophobic group are respectively independently included in one molecule, and in addition, there may be a plurality of types of the hydrophilic group and the hydrophobic group. In addition, as appropriate, a linking group for linking the hydrophilic group and the hydrophobic group can be present.

The hydrophilic group is anionic, cationic, non-ionic, a betaine type which is a combination of these, or the like. It is sufficient if the anionic group has a negative charge; however, a phosphate group, a phosphonate group, a phosphinate group, a sulfate group, a sulfonate group, a sulfinate group or a carboxylic group is preferable, a phosphate group and a carboxylic group are more preferable, and a carboxylic group is even more preferable. It is sufficient if the cationic group has a positive charge; however, an organic cationic substituent is preferable and a nitrogen or phosphorous cationic group is more preferable. In addition, a pyridinium cation or an ammonium cation is even more preferable. Examples of the non-ionic group include polyethylene oxide, polyglycerol, a part of a sugar unit, and the like.

The hydrophilic group is preferably an anionic group. The anionic group is preferably a phosphate group, phosphonate group, a phosphinate group, a sulfate group, a sulfonate group, a sulfinate group or a carboxylic group, more preferably a phosphate group and a carboxylic group, and even more preferably a carboxylic group.

In addition, in a case where the surfactant-type dispersing agent with a low molecular weight has an anionic hydrophilic group, a pKa of 3 or more is preferable from the point of view of promoting an aggregation reaction by coming into contact with an acidic treatment liquid. The pKa of the surfactant-type dispersing agent with a low molecular weight is a value which is determined experimentally using a titration curve by titrating a liquid, where 1 mmol/L of the surfactant-type dispersing agent with a low molecular weight is dissolved in a solvent of tetrahydrofuran and water (3:2=V/V), in an acid or an alkali aqueous solution. When the pKa of the surfactant-type dispersing agent with a low molecular weight is 3 or more, 50% or more of the anionic group is in a non-dissociated state when in contact with a liquid with a pH of 3 in theory. Accordingly, the water solubility of the surfactant-type dispersing agent with a low molecular weight is remarkably reduced and an aggregation reaction occurs. That is, the aggregation reactivity is improved. Also from this point of view, a case where the surfactant-type dispersing agent with a low molecular weight has a carboxylic group as the anionic group is preferable.

The hydrophobic group has a structure such as hydrocarbon-based, fluorocarbon-based, or silicone-based, and in particular, a hydrocarbon-based structure is preferable. In addition, the hydrophobic group may be either of a linear structure or a branched structure. In addition, the hydrophobic group may be a single chain structure or a structure with a plurality of chains, and in the case of a structure with two or more chains, there may be a plurality of types of hydrophobic groups.

In addition, the hydrophobic group is preferably a hydrocarbon group with 2 to 24 carbon atoms, more preferably a hydrocarbon group with 4 to 24 carbon atoms, and even more preferably a hydrocarbon group with 6 to 20 carbon atoms.

Examples of a water-soluble dispersing agent in the polymeric dispersing agents include a hydrophilic polymer compound. For example, examples of a natural hydrophilic polymer compound include plant polymers such as gum arabic, tragacanth gum, guar gum, karaya gum, locust bean gum, arabinogalactan, pectin and quince seed starch; sea weed polymers such as alginic acid, carrageenan and agar; animal polymers such as gelatin, casein, albumin and collagen; and microbial polymers such as xanthene gum and dextran.

In addition, examples of hydrophilic polymer compounds modifying natural products into raw materials include cellulose-based polymers such as methyl cellulose, ethyl cellulose, hydroxyethyl cellulose, hydroxypropyl cellulose, and carboxymethyl cellulose; starch-based polymers such as sodium starch glycolate and sodium starch phosphate ester; seaweed-based polymers such as sodium alginate and propylene glycol alginate, and the like.

Furthermore, examples of synthetic hydrophilic polymer compounds include vinyl polymers such as polyvinyl alcohol, polyvinyl pyrrolidone, and polyvinyl methyl ether, acrylic resins such as non-crosslinked polyacrylamide, polyacrylic acid or alkali metal salts thereof, and water-soluble styrene-acryl resins; polymer compounds having the salt of the cationic functional group in the side chain, such as water-soluble styrene-maleic acid resins, water-soluble vinyl naphthalene-acryl resins, water-soluble vinyl naphthalene maleic acid resins, polyvinyl pyrrolidone, polyvinyl alcohol, alkali metal salts of β-naphthalene sulfonate formalin condensate and quaternary ammonium and amino groups; and natural polymer compounds such as shellac.

Among these, a water-soluble dispersing agent in which a carboxyl group is introduced, such as a copolymer of a homopolymer of acrylic acid, methacrylic acid, or styrene acrylic acid and a monomer having another hydrophilic group, is preferable as the water-soluble polymer compound.

As the water-insoluble dispersing agents in the polymeric dispersing agents, a polymer having both a hydrophobic part and a hydrophilic part can be used. Examples thereof include styrene-(meth)acrylic acid copolymers, styrene-(meth)acrylic acid-(meth)acrylic acid ester copolymers, (meth)acrylic acid ester-(meth)acrylic acid copolymers, polyethylene glycol (meth)acrylate-(meth)acrylic acid copolymers, acetic acid vinyl maleic acid copolymers, styrene-maleic acid copolymers, and the like.

The weight average molecular weight of the polymeric dispersing agent is preferably 3,000 to 100,000, more preferably 5,000 to 50,000, even more preferably 5,000 to 40,000, and particularly preferably 10,000 to 40,000.

From the point of view of self-dispersing and speed of aggregation when in contact with the treatment liquid, the polymeric dispersing agent preferably includes a polymer which has a carboxyl group and a polymer which has a carboxyl group and in which the acid value is 100 mgKOH/g or less is preferable, and a polymer in which the acid value is 25 to 100 mgKOH/g is more preferable. In particular, in a case where the ink composition of the present invention is used with the treatment liquid, which aggregates components in the ink composition, a polymeric dispersing agent which has a carboxyl group and in which the acid value is 25 to 100 mgKOH/g is effective. The treatment liquid will be described later.

As the mixing mass ratio (p:s) of the pigment (p) and the dispersing agent (s), a range of 1:0.06 to 1:3 is preferable, a range of 1:0.125 to 1:2 is more preferable, and even more preferable is 1:0.125 to 1:1.5.

A dye may be used instead of the pigment. In a case where a dye is used, one in which a dye is held in a water-insoluble carrier can be used. The carrier (water-insoluble colored particles) holding the dye can be used as an aqueous dispersion using a dispersing agent. As the dispersing agent, the above-described dispersing agents can be suitably used.

In the present invention, from the point of view of resistance to light, product quality, and the like of the image, the inclusion of the pigment and the dispersing agent is preferable, and the inclusion of the organic pigment and the polymeric dispersing agent along with at least a part of the surface of the pigment being contained as the water-dispersible pigment coated by the polymeric dispersing agent is more preferable. Furthermore, the ink composition particularly preferably includes the organic pigment and a polymeric dispersing agent including a carboxyl group, and includes the water-dispersible pigment where at least a part of the surface of the pigment is coated by the polymeric dispersing agent having a carboxyl group, and from the point of view of aggregability, the pigment is preferably water-insoluble due to being covered by the polymeric dispersing agent including a carboxyl group.

As the average particle diameter of the pigment in a dispersed state, 10 to 200 nm is preferable, 10 to 150 nm is more preferable, and 10 to 100 nm is even more preferable. When the average particle diameter is 200 nm or less, color reproduction is favorable and droplet landing characteristics when droplets are landed using an ink jet method are favorable. When the average particle diameter is 10 nm or more, the resistance to light is favorable. In addition, the particle diameter distribution of the coloring material is not particularly limited, and may be either of a wide particle diameter distribution or a particle diameter distribution with a monodispersed property. In addition, a mixture of two or more kinds of coloring material having a particle diameter distribution with a monodispersed property can be used. Here, the average particle diameter of the pigment in the dispersed state shows the average particle diameter in the state made into an ink; however, the same applies for the so-called concentrated ink dispersion of the stage before being made into an ink.

Here, the average particle diameter of the pigment in a dispersed state and the average particle diameter and particle diameter distribution of the polymer particles are determined by measuring the volumetric average particle diameter with a dynamic light scattering method using a particle size distribution measuring instrument Nanotrac UPA-EX150 (manufactured by Nikkiso Co., Ltd.).

The pigment may be used as one type alone or a combination of two or more types.

As the content of the pigment in the ink composition, 1 to 20 mass % is preferable and 2 to 10 mass % is more preferable with respect to the ink composition from the point of view of image density.

Polyvalent (meth)acrylamide

The ink composition in the present invention contains one type or two or more types of polyvalent (meth)acrylamide compound represented by the following General Formula (1) as at least one type of water-soluble polymerizable compound. This polyvalent (meth)acrylamide compound is a compound which has a polymerizable group and a plurality of (meth)acrylamide structures in the molecule, and which is polymerized by the irradiation of active energy rays. A polyvalent (meth)acrylamide in which the following General Formula (1)≥2 has high polymerizability and polymerization efficiency at the time of curing the image using active energy ray irradiation, whereby the abrasion resistance and scratch resistance of the formed image are increased.

Water solubility refers to the ability to be dissolved in water at a certain concentration or greater, and may include a property of being able to be dissolved in water-based ink or, according to circumstances, the treatment liquid. Specifically, it is preferable that solubility with respect to water be 10 mass % or more, and 15 mass % or more is more preferable.

[Chem. 2]

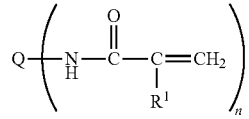

General Formula (1)

The compound represented by the General Formula (1) is one in which an unsaturated vinyl monomer binds to the group Q using an amide binding. In General Formula (1), Q represents an n-valent group, and $R^1$ represents a hydrogen atom or a methyl group. In addition, n represents an integer of 2 or more.

The $R^1$ represents a hydrogen atom or a methyl group, and is preferably a hydrogen atom.

The valent number n of the group Q is 2 or more from the point of view of improving permeability, polymerization efficiency, and ejection stability, with 3 or more and 6 or less being preferable, and 3 or more and 4 or less being more preferable.

Specific examples of a linking group Q when n≥2 and the group Q represents a linking group include a substituted or unsubstituted alkylene group having 4 or less carbon atoms, such as methylene, ethylene, propylene, and butylene groups; a divalent or higher linking group having a saturated or unsaturated heterocycle (pyridine ring, imidazole ring, pyrazine ring, piperidine ring, piperazine ring, morpholine ring, or the like); as well as a divalent or higher residue of a polyol compound including an oxyalkylene group (preferably an oxyethylene group); and a divalent or higher residue of a polyol compound including three or more oxyalkylene groups (preferably oxyethylene groups).
Specific examples of the (meth)acrylamide having a (meth)acrylamide structure in the molecule are shown below. However, the present invention is not limited to these.
[Chem. 3]
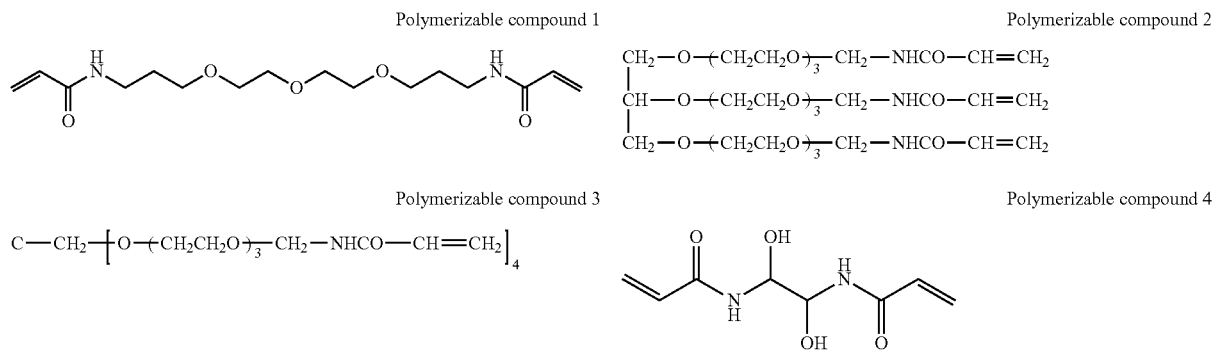
[Chem. 4]
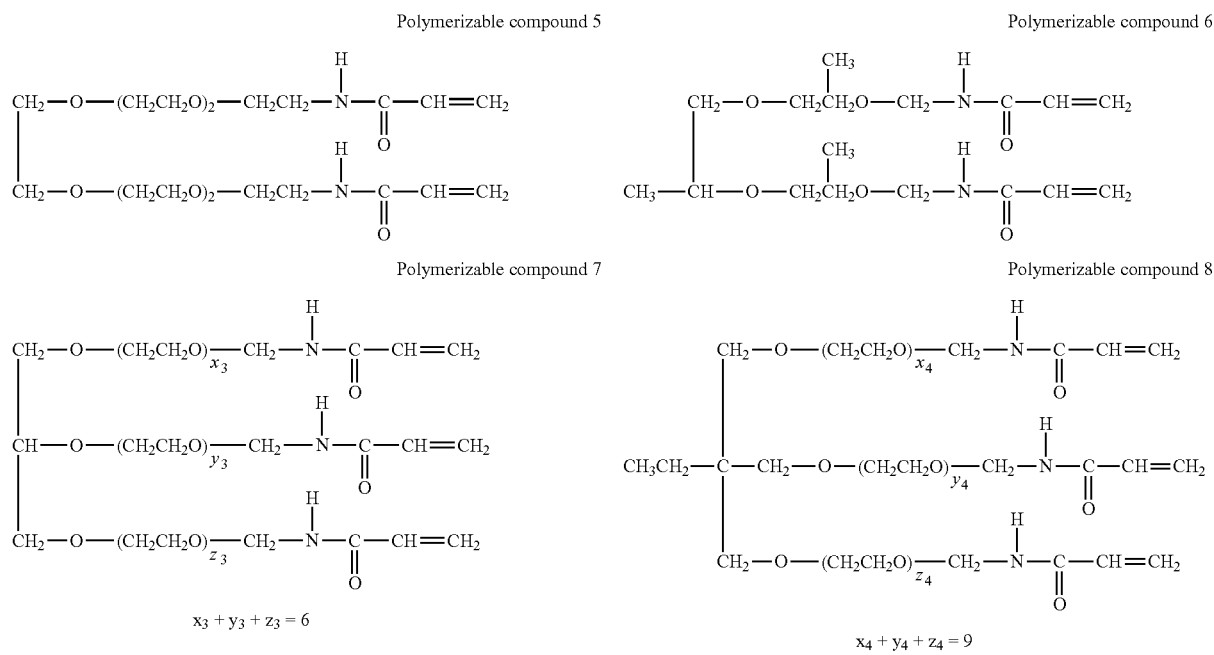
[Chem. 5]
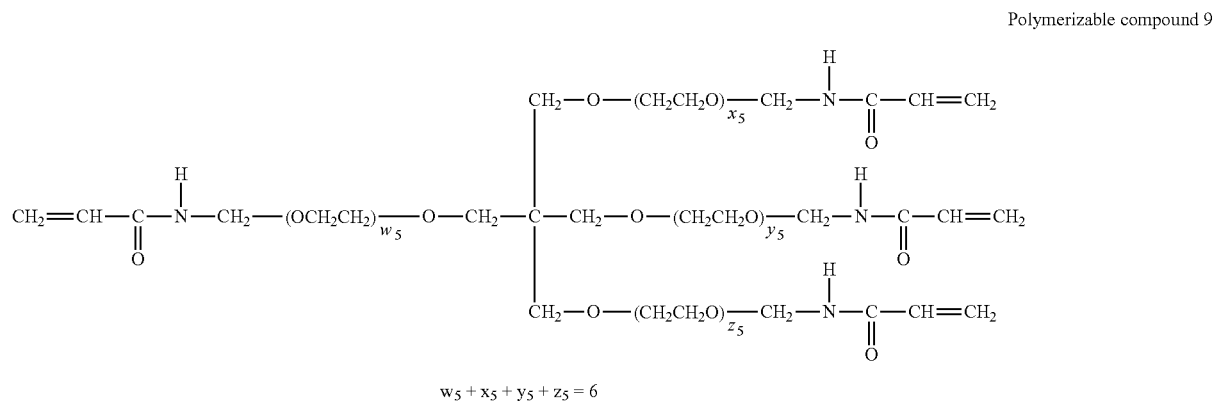

Polymerizable compound 10

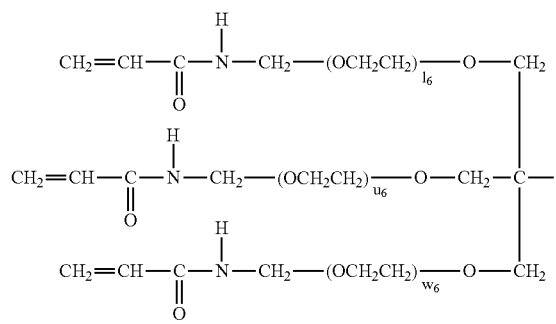

$l_6 + u_6 + w_6 + x_6 + y_6 + z_6 = 12$

Polymerizable compound 11

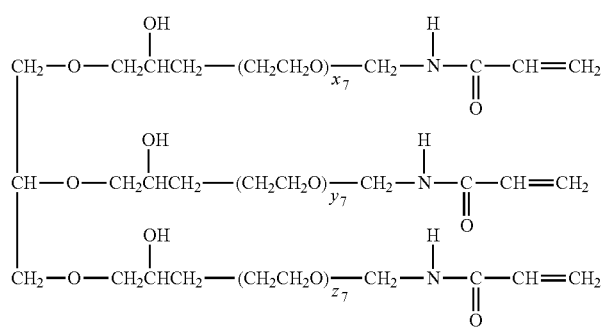

$x_7 + y_7 + z_7 = 3$

Polymerizable compound 12

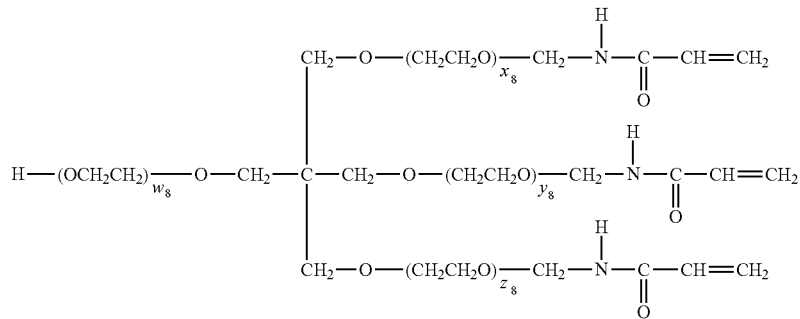

$w_8 + x_8 + y_8 + z_8 = 6$

Polymerizable compound 13

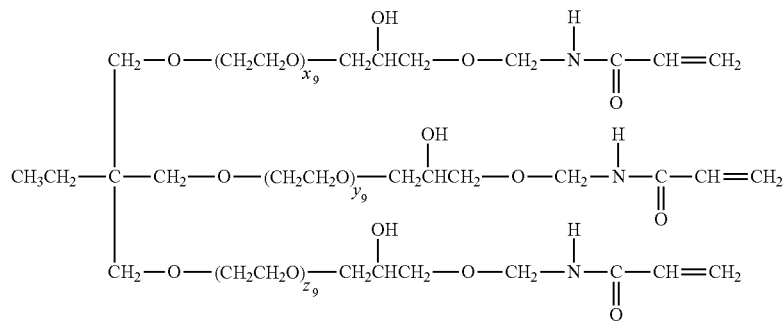

$x_9 + y_9 + z_9 = 3$

In addition, as the polyvalent (meth)acrylamide compound, the compound represented by the following General Formula (2) is preferable in terms of providing high polymerizability and curability. This compound has four acrylamide groups or methacrylamide groups as polymerizable groups in the molecule. In addition, for example, this compound exhibits its curability based on a polymerization reaction according to the application of active energy rays such as α-rays, γ-rays, X-rays, ultraviolet rays, visible light rays, infrared light rays, or an electron beam, or energy such as heat. The compound represented by the following General Formula (2) exhibits water solubility and dissolves well in water, or a water-soluble organic solvent such as alcohol.

[Chem. 6]

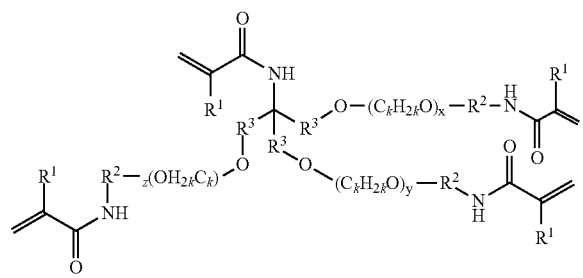

General Formula (2)

In the General Formula (2), $R^1$ represents a hydrogen atom or a methyl group, and is preferably a hydrogen atom. A plurality of $R^1$ may be the same or different from each other. $R^2$ indicates a linear or branched alkylene group having 2 to 4 carbon atoms. A plurality of $R^2$ may be the same or different from each other. $R^2$ is preferably an alkylene group having 3 to 4 carbon atoms, more preferably an alkylene group having 3 carbon atoms, and particularly preferably a linear alkylene group having 3 carbon atoms. The alkylene group of $R^2$ may also have a substituent, and examples of the substituent include an aryl group, an alkoxy group, or the like.

However, in $R^2$, the oxygen atoms and nitrogen atoms bonded to both ends of the $R^2$ do not have a structure which is bonded to the same carbon atom of $R^2$. $R^2$ is a linear or branched alkylene group linking the oxygen atoms and nitrogen atoms of the (meth)acrylamide group. Here, in a case where the alkylene group has a branched structure, it is considered that the oxygen atoms and nitrogen atoms of the (meth)acrylamide group at both ends take an —O—C—N— structure (hemiaminal structure) bonded to the same carbon atom in the alkylene group; however, the compound represented by General Formula (2) does not include a compound of such a structure. The compound having the —O—C—N— structure in the molecule is not preferable in terms of factors such as that, since decomposition easily occurs at the position of the carbon atom, decomposition easily occurs during storage, and the storage stability is decreased in a case where the ink composition is contained.

$R^3$ represents a divalent linking group, and a plurality of $R^3$ may be the same or different from each other. Examples of the divalent linking group represented by $R^3$ include an alkylene group, an arylene group, a heterocyclic group, a group formed of a combination of these, or the like, and an alkylene group is preferable. Here, in a case where the divalent linking group includes an alkylene group, at least one type of group selected from —O—, —S—, and —NR$^a$— may be further included in the alkylene group. $R^a$ represents a hydrogen atom or an alkyl group having 1 to 4 carbon atoms.

In a case where $R^3$ includes an alkylene group, examples of the alkylene group include a methylene group, an ethylene group, a propylene group, a butylene group, a pentylene group, a hexylene group, a heptylene group, an octylene group, a nonylene group, or the like. The alkylene group of $R^3$ preferably has 1 to 6 carbon atoms, more preferably 1 to 3, and particularly preferably 1. In the alkylene group of $R^3$, at least one type selected from —O—, —S—, and —NR$^a$— may be further included. Examples of the alkylene group including —O— include —$C_2H_4$—O—$C_2H_4$—, —$C_3H_6$—O—$C_3H_6$—, and the like. The alkylene group of $R^3$ may also have a substituent, and examples of the substituent include an aryl group, an alkoxy group, or the like.

In a case where $R^3$ includes an arylene group, examples of the arylene group include a phenylene group, a naphthylene group and the like, and the number of carbon atoms of the arylene group of $R^3$ is preferably 6 to 14, more preferably 6 to 10, and particularly preferably 6. The arylene group of $R^3$ may also have a substituent, and examples of the substituent include an alkyl group, an alkoxy group, or the like.

In a case where $R^3$ includes a heterocyclic group, as the heterocyclic group, a 5-membered or 6-membered heterocyclic group is preferable, and these may be further condensed. In addition, the heterocycle may be an aromatic heterocycle or a non-aromatic heterocycle. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like. Among these, an aromatic heterocyclic group is preferable, and pyridine, pyrazine, pyrimidine, pyridazine, triazine, pyrazole, imidazole, benzimidazole, triazole, thiazole, benzothiazole, isothiazole, benzisothiazole, and thiadiazole are preferable. Here, the heterocyclic groups shown above have been illustrated in a form in which the substitution position is omitted; however, the substitution position is not limited, for example, for pyridine, substitution can take place at the 2-position, 3-position, and 4-position and all these substitutions can be included.

The heterocyclic group may also have a substituent, and examples of the substituent include an alkyl group, an aryl group, an alkoxy group, or the like.

k in the General Formula (2) represents 2 or 3. A plurality of k may be the same or different from each other. In addition, $C_kH_{2k}$ may be a linear structure or a branched structure.

In addition, x, y, and z each independently represent integers of 0 to 6, preferably integers of 0 to 5, and more preferably integers of 0 to 3. x+y+z satisfies 0 to 18, preferably satisfies 0 to 15, and more preferably satisfies 0 to 9.

Among the above, $R^1$ represents a hydrogen atom or a methyl group, $R^2$ represents an alkylene group having 2 to 4 carbon atoms, $R^3$ represents an alkylene group having 1 to 6 carbon atoms (preferably 1 to 3 carbon atoms), k represents 2 or 3, x, y, and z each independently represent integers of 0 to 6, and a case where x+y+z is 0 to 15 is satisfied is preferable.

Specific examples of the compound represented by General Formula (2) are shown below. However, the present invention is not limited to these.

[Chem. 7]

Polymerizable compound a

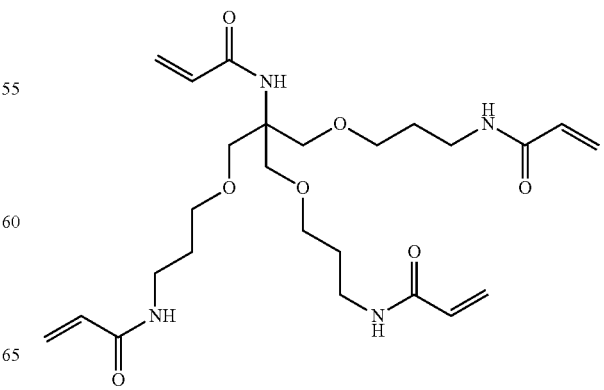

Polymerizable compound b
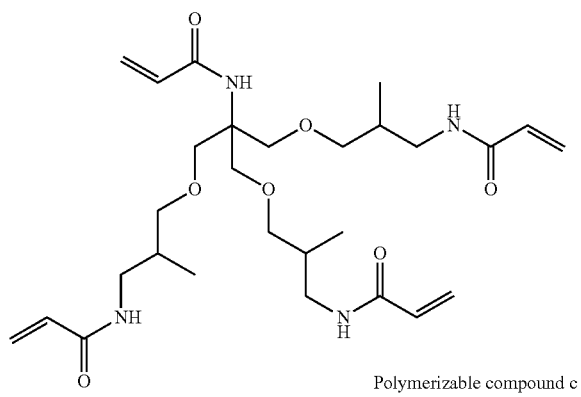
Polymerizable compound c
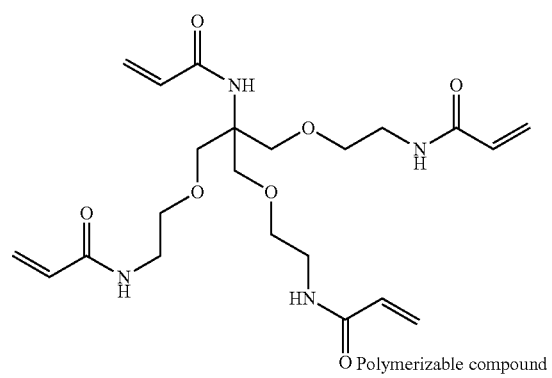
Polymerizable compound d
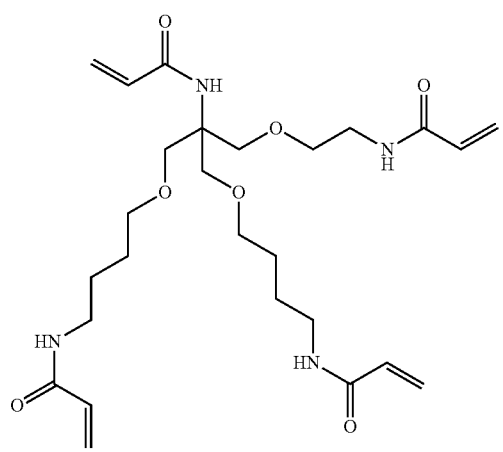
Polymerizable compound e
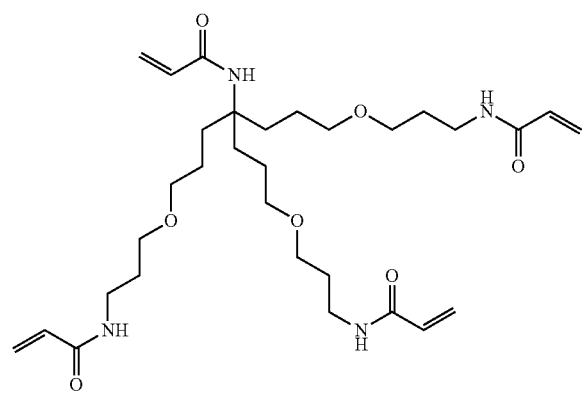
Polymerizable compound f
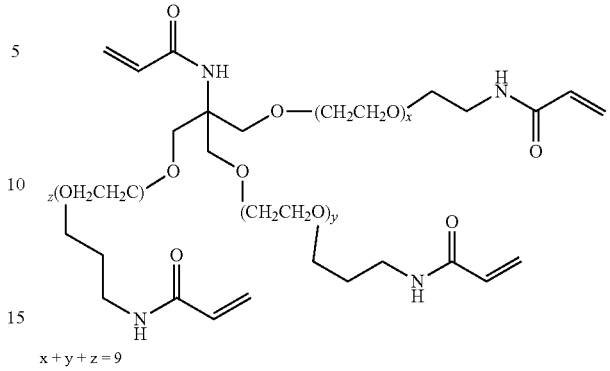
x + y + z = 9
The compound represented by the General Formula (2) can be prepared according to the following Scheme 1 or Scheme 2, for example.
[Chem.8]
Scheme 1
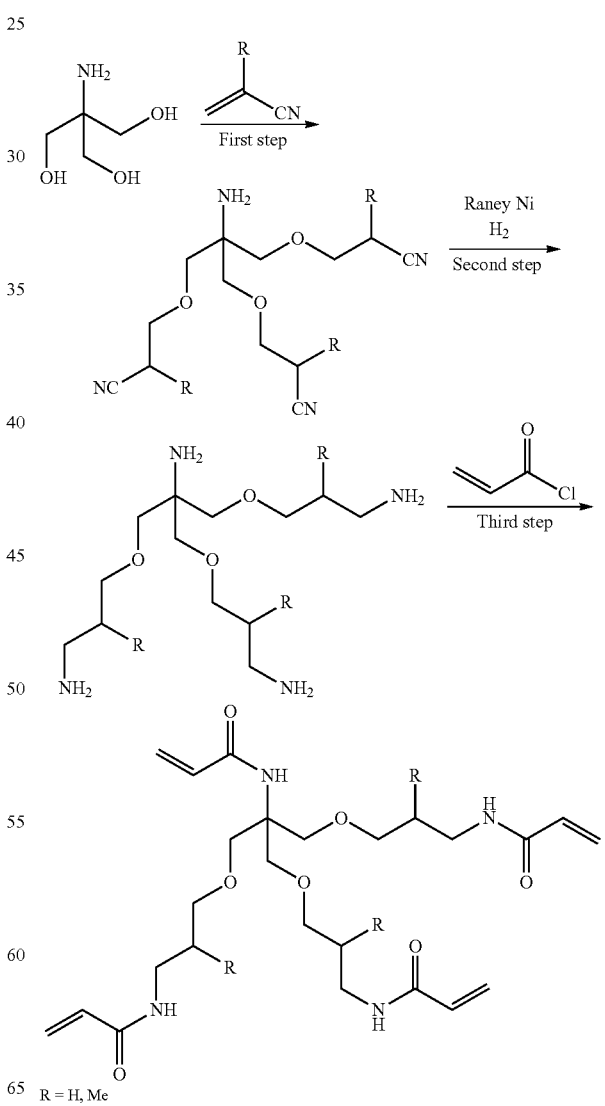
R = H, Me In Scheme 1, the first step is a step of obtaining a polycyano compound by a reaction of acrylonitrile and trishydroxymethylaminomethane. The reaction in this step is preferably performed at 3 to 60° C. for 2 to 8 hours.

The second step is a step of reacting the polycyano compound with hydrogen in the presence of a catalyst and obtaining a polyamine compound by a reduction reaction. The reaction in this step is preferably performed at 20 to 60° C. for 5 to 16 hours.

The third step is a step of obtaining a polyfunctional acrylamide compound by an acylating reaction of the polyamine compound and acrylic acid chloride or methacrylic chloride. The reaction in this step is preferably performed at 3 to 25° C. for 1 to 5 hours. Here, instead of acrylic acid chloride, the acylating agent may use diacrylate anhydride or dimethacrylic anhydride. Here, in the acylation step, by using both acrylic acid chloride and methacrylic acid chloride, a compound having an acrylamide group and methacrylamide group in the same molecule as the final product can be obtained.

[Chem. 9]

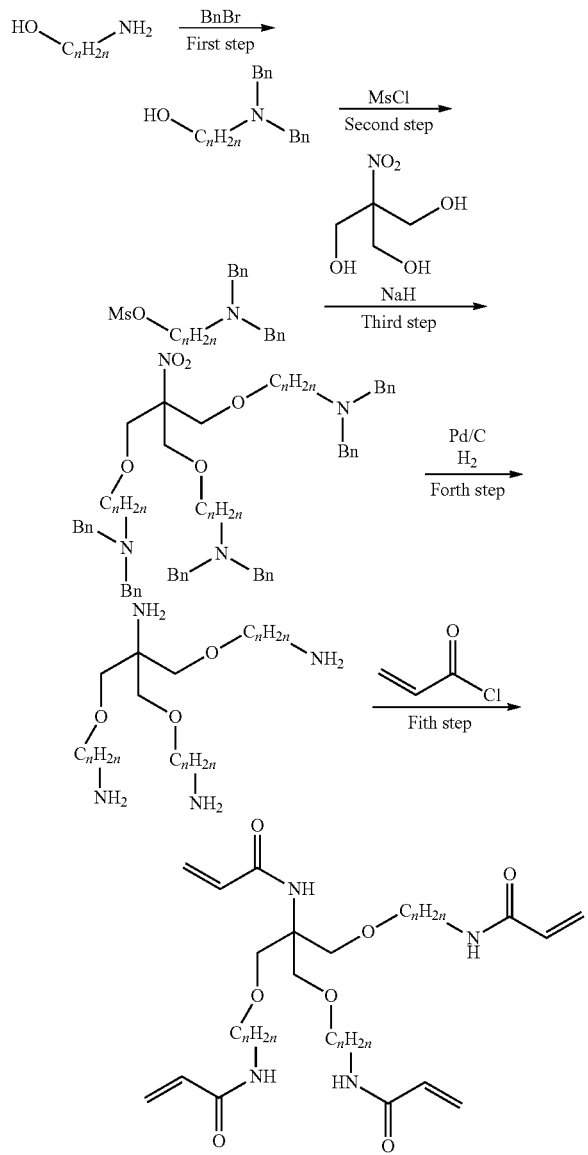

Scheme 2

In the Scheme 2, the first step is a step of obtaining a nitrogen protected amino alcohol compound by a protective group introduction reaction according to a benzyl group, a benzyloxycarbonyl group, or the like in a nitrogen atom of an amino alcohol. The reaction in this step is preferably performed at 3 to 25° C. for 3 to 5 hours.

The second step is a step of introducing a leaving group such as a methanesulfonyl group, a p-toluenesulfonyl group, or the like into an OH group of a nitrogen protected amino alcohol compound, and obtaining a sulfonyl compound. The reaction in this step is preferably performed at 3 to 25° C. for 2 to 5 hours.

The third step is a step of obtaining an amino alcohol adduct compound by an SN2 reaction of the sulfonyl compound and tris hydroxymethyl nitro methane. The reaction in this step is preferably performed at 3 to 70° C. for 5 to 10 hours.

The fourth step is a step of reacting the amino alcohol adduct compound with hydrogen in the presence of a catalyst and obtaining a polyamine compound by a hydrogenation reaction. The reaction in this step is preferably performed at 20 to 60° C. for 5 to 16 hours.

The fifth step is a step of obtaining a polyfunctional acrylamide compound by an acylating reaction of the polyamine compound and acrylic acid chloride or methacrylic chloride. The reaction in this step is preferably performed at 3 to 25° C. for 1 to 5 hours. Here, instead of acrylic acid chloride, the acylating agent may use diacrylate anhydride or dimethacrylic anhydride. Here, in the acylation step, by using both acrylic acid chloride and methacrylic acid chloride, a compound having an acrylamide group and methacrylamide group in the same molecule as the final product can be obtained.

The compound obtained through the above-described steps is obtained by purification of the reaction product solution by a conventional method. For example, purification can be performed by liquid separation and extraction using an organic solvent, crystallization using a poor solvent, column chromatography using silica gel, or the like.

The content of the polyvalent (meth)acrylamide in the ink composition is, with respect to the total mass of the ink composition, from 3 mass % or more and 15 mass % or less, more preferably from 5 mass % or more and 12.5 mass % or less, and even more preferably from 5 mass % or more and 10 mass % or less. When the content of the polyvalent (meth)acrylamide is less than 3 mass %, the curing reaction itself is insufficient and uniform curing in the entire image is not achieved, whereby uniform gloss cannot be obtained. In addition, when the content of the polyvalent (meth)acrylamide exceeds 15 mass %, the curing reactivity is not made uniform across the entire image in the same manner, whereby uniform gloss cannot be obtained.

In the present invention, an aspect in which the above-described polyvalent (meth)acrylamide and a polyvalent allyl compound are used together is also suitable. Examples of the polyvalent allyl compound include trimethylolpropane diallyl ether, glycerol diallyl ether, pentaerythritol diallyl ether, pentaerythritol triallyl ether, di-pentaerythritol penta allyl ether, di-pentaerythritol tetra-allyl ether, allyl ether compounds such as di-pentaerythritol triallyl ether and alkylene oxide derivative thereof, and triallyl isocyanate.

In the present invention, an aspect in which the above-described polyvalent (meth)acrylamide and a polyvalent allyl compound are used together is also suitable. By including the monofunctional (meth)acrylamide, ink having excellent ink penetration into the pigment layer in the coated paper is obtained. In this manner, the pigment layer is cured as well as the image and the adhesion is further improved.

Examples of the monofunctional (meth)acrylamide include the compounds in a case where n=1 in the General Formula (1). It is sufficient if the group Q in a case where n=1 is a monovalent group capable of linking with the (meth) acrylamide structure, and a group having water solubility is suitable as the group Q in a case where n=1. Specifically, examples thereof include a monovalent residue in which one or more hydrogen atoms or hydroxyl groups are removed from a compound selected from a compound group X below.

Compound group X: ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentane diol, 2-methyl-2,4-pentane diol, 1,5-hexanediol, 1,6-hexanediol, 2,5-hexanediol, glycerin, 1,2,4-butane triol, 1,2,6-hexane triol, 1,2,5-pentane triol, thio glycol, trimethylolpropane, ditrimethylolpropane, trimethylol ethane, ditrimethylol ethane, neopentyl glycol, pentaerythritol, dipentaerythritol, and condensates thereof, polyol compounds such as low molecular polyvinyl alcohols or sugars, and polyamine compounds such as ethylenediamine, diethylenetriamine, triethylenetetramine, polyethyleneimine, and polypropylene diamine.

Examples of the monofunctional (meth)acrylamide include the following compounds.

[Chem. 10]

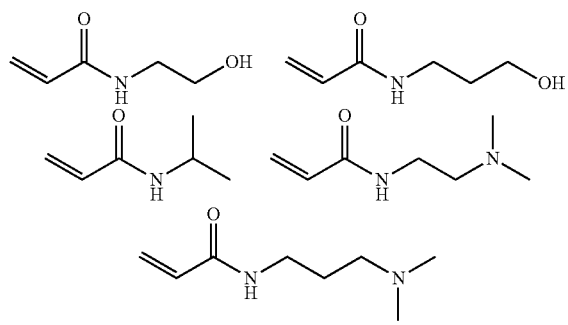

In the present invention, an aspect in which the above-described polyvalent (meth)acrylamide and a monofunctional allyl ether are used together is also suitable.

Examples of monofunctional allyl ether, include ethylene glycol allyl ether, propylene glycol monoallyl ether, neopentyl glycol monoallyl ether, trimethylolpropane monoallyl ether, 1,2-butylene glycol monoallyl ether, 1,3-butylene glycol monoallyl ether, hexylene glycol monoallyl ether, octylene glycol monoallyl ether, and pentaerythritol monoallyl ether.

In addition, in the present invention, an aspect in which the above-described polyvalent (meth)acrylamide and a monofunctional N-vinyl lactam compound are used together is also suitable.

The N-vinyl lactam compound is not particularly limited; however, a monofunctional N-vinyl lactam compound (that is, an N-vinyl lactam compound having one ethylenic double bond) is preferable. Preferable examples of the N-vinyl lactam compound include the compounds represented by the following general formula (A).

[Chem. 11]

General formula (A)

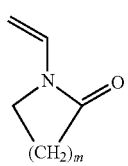

In the general formula (A), m represents an integer of 1 to 5.

From the viewpoints of flexibility after the ink composition is cured, adhesion to the target recording medium, and the availability of raw materials, m is preferably an integer of 2 to 4, more preferably 2 or 4. That is, at least one of N-vinyl pyrrolidone and N-vinyl caprolactam is particularly preferable as the compound represented by the general formula (A). Among these, in terms of excellent safety, being available generically at a relatively low cost, and being able to obtain a particularly good ink curing property and adhesion to the target recording medium of the cured film, N-vinyl caprolactam is preferable.

In addition, the N-vinyl lactam compound may have a substituent such as an alkyl group or an aryl group on the lactam ring, and a saturated or unsaturated ring structure may be linked.

The N-vinyl lactam compound may be included in the ink composition singly, or may be included in combination with a plurality of compounds.

The N-vinyl lactam compound may be contained as only one kind in the ink composition, or may be contained as a combination of a plurality of species.

In addition, the above-described polyvalent (meth)acrylamide and a cationic polymerizable compound may be used together. The cationic polymerizable compound is a compound that has a cationic group and a polymerizable group with an unsaturated double bond or the like, and for example, epoxy monomers or oxetane monomers can be suitably used. If a cationic polymerizable compound is contained, the cationic property of the ink composition is strengthened by including a cationic group, and mixing of colors when an anionic ink is used is prevented more effectively.

In the ink composition of the present invention, the total amount of the polymerizable compound (including the polyvalent (meth)acrylamide) with respect to the total amount of the composition is preferably 10% or more and 50% or less by mass ratio, and more preferably 15% or more and 35% or less. By the total amount of the polymerizable compound being within the above range, the curing is made uniform over the entire image with favorable curing reactivity.

Polymerization Initiator

The ink composition in the present invention can contain at least one type of polymerization initiator which initiates the polymerization of the polymerizable compound using an active energy rays. The polymerization initiator may be used alone, by mixing two or more types, or used together with a sensitizer. Here, the polymerization initiator may be included only in the ink composition; however, it may also be included in both of the ink composition and the treatment liquid to be described later, or included only in the treatment liquid.

The polymerization initiator can contain an appropriately selected compound, which is able to initiate a polymerization reaction of the polymerizable compound using active energy rays. Examples of polymerization initiators include polymerization initiators (for example, photopolymerization initiators and the like) that generate active species (radicals, acids, bases, and the like) using radiation, light, or electron beams.

Examples of photopolymerization initiators include acetophenone, 2,2-diethoxyacetophenone, p-dimethylamino acetophene, p-dimethylamino propiophenone, benzophenone, 2-chloro benzophenone, p, p'-dichloro-benzophene, p, p'-bis diethylamino benzophenone, Michler's ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuram mono-sulfide, thioxanthone, 2-chloro thioxanthone, 2-methyl thioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy- 2-methyl-1-propane-1-on, 2-hydroxy-2-methyl-1-phenyl-1-on, 1-(4-isopropylphenyl)-2-hydroxy-2-methyl propane-1-on, methylbenzoyl formate, and the like. Furthermore, examples thereof include aromatic diazonium salts, aromatic halonium salts, aromatic sulfonium salts, metallocene compounds, and the like of triphenylsulfonium hexafluorophosphate and diphenyliodonium hexafluoroantimonate, and the like. Among these, from the viewpoint that the compatibility with the ink is high and the gloss unevenness is reduced, 1-[4-(2-hydroxyethoxy)-phenyl]-2-hydroxy-2-methyl-1-propane-1-on is preferable.

In a case where the ink composition contains the polymerization initiator, the content of the polymerization initiator in the ink composition is preferably 1 to 40 mass % with respect to the polymerizable compound and more preferably 1 to 10 mass %. When the content of the polymerization initiator is 1 mass % or more, the abrasion resistance and scratch resistance of the image are further improved and it is advantageous for high-speed recording and when the content is 40 mass % or less, it is advantageous from the viewpoint of ejection stability.

Examples of the sensitizer include an amine (an aliphatic amine, an amine that includes an aromatic group, piperidine, and the like), a urea (an allyl, o-tolylthio urea, and the like), a sulfur compound (sodium diethyl dithiophosphate, aromatic sulfinic acid soluble salt, and the like), a nitrile-based compound (N,N, di-substituted p-amino benzonitrile, and the like), a phosphorous compound (tri-n-butyl phosphine, sodium diethyl dithio phosphide, and the like), a nitrogen compound (Michler's ketone, an N-nitroso hydroxylamine derivative, an oxazolidine compound, a tetrahydro 1,3 oxazine compound, formaldehyde, a condensate of acetaldehyde and a diamine, and the like), a chlorine compound (carbon tetrachloride, hexachloroethane, and the like), an amine polymer of a reaction product between an epoxy resin and an amine, triethanolamine triacrylate, and the like.

The sensitizer can be contained in a range which does not impair the effects of the present invention.

Water

The ink composition of the present invention contains water and the amount of the water is not particularly limited. In particular, a preferable content amount of water is 10 to 99 mass %, more preferably 30 to 80 mass %, and even more preferably 50 to 70 mass %.

Surfactant

The surfactant is not particularly limited, and it is possible to use nonionic surfactants, cationic surfactants, anionic surfactants, zwitterionic surfactants (for example, betaine based surfactant), and the like.

The content of the surfactant in the ink composition is not particularly limited as long as it is within a range in which it is possible to adjust the surface tension of the ink composition to preferably 20 to 60 mN/m (more preferably, 20 to 45 mN/m, even more preferably 25 to 40 mN/m). With respect to the total mass of the ink composition, the content of the surfactant is preferably 0.3 to 2.5 mass %, and more preferably 0.5 to 2 mass %. When the content is within this range, it is possible to favorably land the ink composition using the ink jet method.

The surfactant may be used alone as one type, or may be used in combination of two or more arbitrary kinds.

Among the surfactants, examples of anionic surfactants include fatty acid salts, alkyl sulfate ester salts, alkylbenzene sulfonate, alkyl naphthalene sulfonate, dialkyl sulfosuccinate salts, alkyl phosphate ester salts, naphthalenesulfonic acid products, polyoxyethylene alkyl sulfate ester salts, and the like.

Examples of the nonionic surfactant include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, oxyethylene oxypropylene block copolymers, and the like. In addition, Olfine, which is an acetylene based polyoxyethylene oxide surfactant (manufactured by Nissin Chemical Industry Co.), and SURFYNOLS (manufactured by Air Products & Chemicals Inc.) are also preferably used.

Examples of a zwitterionic surfactant include amine oxide type surfactants such as N,N-dimethyl-N-alkyl amine oxides.

Furthermore, it is also possible to use the surfactants exemplified in pages 37-38 of JP1984-157636A (JP-S59-157636A), and in Research Disclosure No. 308119 (1989). In addition, fluorine (fluorinated alkyl based) based surfactants, silicone-based surfactants, and the like described in each publication of JP2003-322926A, JP2004-325707A, and JP2004-309806A may be exemplified, and it is possible to improve the abrasion resistance by using these surfactants.

These surfactants can also be used as anti-foaming agents, and chelating agents and the like represented by fluorine compounds, silicone compounds, and EDTA can be used.

Examples of particularly preferable surfactants in the present invention include Olfine E1010 and Olfine E1020 (manufactured by Nissin Chemical Industry Co.).

Water-Soluble Organic Solvent

The ink composition according to the present invention may also contain a water-soluble organic solvent. In a case where the water-soluble organic solvent is contained, it is preferable that the content thereof be small and the content of the water-soluble organic solvent in the present invention be less than 3 mass % with respect to the total mass of the ink composition.

In the present invention, that the content of the water-soluble organic solvent is less than 3 mass % has the meaning that the water-soluble organic solvent is not actively contained in the ink composition, and preferably, that the water-soluble organic solvent is not included (content: 0 mass %).

The water-soluble organic solvent has the effect of preventing drying of the ink composition and promoting wetting and permeation on paper. Examples of water-soluble organic solvents that the ink composition may contain include glycols such as glycerin, 1,2,6-hexane triol, trimethylol propane, ethylene glycol, propylene glycol, diethylene glycol, triethylene glycol, tetraethylene glycol, penta-ethylene glycol, and dipropylene glycol, and polyhydric alcohols such as an alkane diol such as 2-butene-1,4-diol, 2-ethyl-1,3-hexane diol, 2-methyl-2,4-pentane diol, 1,2-octanediol, 1,2-hexanediol, 1,2-pentane diol, and 4-methyl-1,2-pentanediol, as well as a sugar, a sugar alcohol, a hyaluronic acid, alkyl alcohols with 1 to 4 carbon atoms, glycol ethers, 2-pyrrolidone, and N-methyl-2-pyrrolidone disclosed in paragraph number [0116] of JP2011-42150A, alkylene oxide adducts of glycerin as described in paragraph numbers [0121] to [0125] of JP2011-42150A, and the like. One type or two or more types of these solvents may be used selectively as appropriate. Polyvalent alcohols are also useful as anti-drying agents and wetting agents, and, for example, include the example described in paragraph number [0117] of JP2011-42150A. In addition, polyol compounds are preferable as a wetting agent, and, for example, include the example described in paragraph number [0117] of JP2011-42150A as an aromatic diol.

Polymer Particles

The ink composition of the present invention can contain at least one type of polymer particles. The polymer particles have a function of aggregating due to dispersion instability in the ink composition when coming into contact with the treatment liquid which will be described later or a region where this has been dried and fixing the ink composition due to increased viscosity, whereby the adhesion of the ink composition to the recording medium and the scratch resistance of the image can be further improved.

In the ink composition of the present invention, the polymer particles can be used from the viewpoint of aggregation speed, glossiness of the formed image, and the like in a case where a treatment liquid to be described later is used at the time of image forming. In a case where the polymer particles are contained, the content of the polymer particles can be appropriately selected in a range of 1 mass % or more and 30 mass % or less by solid content concentration with respect to the ink composition. The content of the polymer particles is preferably 1 to 10 mass % and more preferably 1 to 3 mass % from the point of view of favorably maintaining ink ejectability while increasing the abrasion resistance and scratch resistance of the image. The polymer particles can be used alone as one type, or by mixing two or more types.

The polymer particles can be used as, for example, a latex where a polymer in particle form is dispersed into an aqueous medium. As the polymer, an acrylic resin, a vinyl acetate resin, a styrene-butadiene resin, a vinyl chloride resin, an acrylic-butadiene resin, a butadiene resin, a styrene resin, a cross-linked acrylic resin, a cross-linked styrene-based resin, a benzoguanamine resin, a phenol resin, a silicone resin, an epoxy resin, a urethane resin, a paraffin-based resin, a fluorine resin, or the like can be used. Among these, preferable examples include an acrylic resin, an acrylic-styrene resin, a styrene resin, a cross-linked acrylic resin, and a cross-linked styrene-based resin.

The aqueous medium is configured to include water and may include a hydrophilic organic solvent as required. In the present invention, the aqueous medium is preferably configured from water and a hydrophilic organic solution of 0.2 mass % or less with regard to the water and is more preferably configured by water.

In the polymer particles, self-dispersing polymer particles are preferable. The particles of a self-dispersing polymer are a water-insoluble polymer which is able to be in a dispersed state in an aqueous medium due to a functional group of the polymer itself (particularly, an acid group or a salt thereof) when in a dispersed state (particularly a dispersed state using a phase transfer emulsification method) when there is no surfactant and has the meaning of particles of a water-insoluble polymer which does not contain a free emulsifier. The self-dispersing polymer particles are preferable from the point of view of the ejection stability and liquid stability (particularly dispersion stability) of a system which includes the pigment.

Here, the dispersed state includes both the states of an emulsion state (emulsion) where the water-insoluble polymer is dispersed in a liquid state in the aqueous medium and a dispersion state (suspension) where the water-insoluble polymer is dispersed in a solid state in the aqueous medium. The water-insoluble polymer of the present invention is preferably a water-insoluble polymer which is able to be in a dispersion state where the water-insoluble polymer is dispersed in a solid state from the point of view of aggregation speed and fixability when set as a liquid composition.

An example of a method of preparing the emulsion or dispersion state of the self-dispersing polymer, that is, the soluble dispersant of the self-dispersing polymer, includes a phase transfer emulsification method. An example of the phase transfer emulsification method includes a method where an aqueous dispersant which is in an emulsified or dispersed state is obtained by being introduced into water as it is after dissolving or dispersing the self-dispersing polymer in a solvent (for example, a hydrophilic organic solvent or the like) without a surfactant being added, being stirred and mixed in a state where a salt forming group of the self-dispersing polymer (for example, an acid group) is neutralized, and the solvent being removed.

The dispersion state of the particles of the self-dispersing polymer refers to a state where, after a solution where 30 g of the water-insoluble polymer is dissolved in 70 g of an organic solvent (for example, a methyl ethyl ketone), a neutralizing agent which is able to 100% neutralize the salt forming group of the water-insoluble polymer (sodium hydroxide if the salt forming group is anionic and acetic acid if catonic), and 200 g of water are mixed and stirred (apparatus: a stirring apparatus with a stirring blade, number of rotations 200 rpm, 30 minutes, 25° C.), the presence of the dispersion state is able to be visually confirmed as being stable for at least one week at 25° C. even after the organic solvent has been removed from the mixture solution.

In addition, the water-insoluble polymer refers to a polymer where the dissolved amount thereof is 10 g or less when the polymer is dissolved in 100 g of water at 25° C. after being dried for 2 hours at 105° C. The dissolved amount is preferably 5 g or less, more preferably 1 g or less. The dissolved amount is the dissolved amount at the time of 100% neutralization by sodium hydroxide or acetic acid according to the type of the salt forming group of the water-insoluble polymer.

The particles of the self-dispersing polymer of the present invention are described in detail in paragraph numbers [0066] to [0113] of JP2011-042150A, which can be referred to and applied in the present invention.

The self-dispersing polymer particles of the present invention preferably include a water-insoluble polymer including a hydrophilic constituent unit and a constituent unit derived from an aromatic group-containing monomer from the point of view of the self-dispersing property.

The hydrophilic constituent unit is not particularly limited as long as it is a repeating unit derived from a hydrophilic group-containing monomer. The hydrophilic group-containing monomer is preferably a dissociative group-containing monomer from the point of view of self-dispersion and aggregation, and a dissociative group-containing monomer having a dissociative group and an ethylenic unsaturated bond is preferable. Examples of the dissociative group-containing monomer include an unsaturated carboxylic acid monomer, an unsaturated sulfonic acid monomer, an unsaturated phosphoric acid monomer, and the like. Specific examples of the unsaturated carboxylic acid monomer include an acrylate, a methacrylate, a crotonate, an itaconate, a maleicate, a fumarate, a citraconate, or 2-methacryloyloxymethylsuccinate. In the dissociative group-containing monomer, from the point of view of dispersion stability and discharge stability, an unsaturated carboxyl monomer is preferable, an acrylic monomer is more preferable, and acrylate or methylate is particularly preferable.

The aromatic group-containing monomer is not particularly limited as long as it is a compound including an aromatic group and a polymerizable group. The aromatic group-containing monomer is preferably a monomer having an aromatic group derived from an aromatic hydrocarbon and an ethylenically unsaturated bond and examples thereof include phenoxyethyl (meth)acrylate, benzyl (meth)acrylate, phenyl (meth)acrylate, styrene-based monomers, and the like. Among these, from the point of view of the balance between the hydrophilic property and the hydrophobic property of a polymer chain and the fixability of the ink, an aromatic group containing a (meth)acrylate monomer is preferable, at least one type selected from a phenoxyethyl(meth)acrylate, a benzyl(meth)acrylate, and a phenyl(meth)acrylate is more preferable, and phenoxyethyl(meth)acrylate or benzyl(meth)acrylate is even more preferable.

As the acid value of the self-dispersing polymer is preferably 25 to 100 mgKOH/g, and more preferably 30 to 70 mgKOH/g from the point of view of excellent aggregation when coming into contact with the treatment liquid. By the acid value being 25 mgKOH/g or more, a stable self-dispersing property is obtained. From the point of view of the self-dispersing property and speed of aggregation when in contact with the treatment liquid, the self-dispersing polymer particles more preferably include a polymer which has a carboxyl group and in which the acid value is in the above range.

As the molecular weight range of the water-insoluble polymer configuring the self-dispersing polymer particles, a weight average molecular weight of 3,000 to 200,000 is preferable, 5,000 to 150,000 is more preferable, and 10,000 to 100,000 is even more preferable. By setting the weight average molecular weight to 3,000 or more, the amount of water-soluble components can be effectively suppressed. In addition, by setting the weight average molecular weight to 200,000 or less, the self-dispersion stability can be increased.

Here, the weight average molecular weight is measured by gel permeation chromatography (GPC). The GPC used a high-speed GPC (gel permeation chromatography) HLC-8220 GPC (manufactured by Tosoh Co., Ltd.), used three columns of TSKgeL Super HZM-H, TSKgeL Super HZ4000, TSKgeL Super HZ2000 (manufactured by Tosoh Co., Ltd. 4.6 mmID×15 cm) as columns, and used THF (tetrahydrofuran) as an eluent.

The water-insoluble polymer configuring the self-dispersing polymer particles preferably includes a structural unit derived from an aromatic group-containing (meth)acrylate monomer (preferably a structural unit derived from phenoxyethyl(meth)acrylate and/or a structural unit derived from benzyl(meth)acrylate) with a copolymerization ratio of 15 to 80 mass % of the total amount of the self-dispersing polymer particles from the point of view of controlling the hydrophilic property of the polymer.

In addition, from the point of view of controlling the hydrophilic property of the polymer, the water-insoluble polymer preferably includes a constituent unit derived from an aromatic group-containing (meth)acrylate monomer with a copolymerization ratio of 15 to 80 mass %, a constituent unit derived from a carboxyl group-containing monomer, and a constituent unit derived from an alkyl group-containing monomer (preferably a structural unit derived from alkyl ester of (meth)acrylic acid), and more preferably includes a structural unit derived from phenoxyethyl(meth)acrylate and/or a structural unit derived from benzyl(meth)acrylate with a polymerization ratio of 15 to 80 mass %, a constituent unit derived from a carboxyl group-containing monomer, and a constituent unit derived from an alkyl group-containing monomer (preferably a structural unit derived from alkyl ester of (meth)acrylic acid having 1 to 4 carbon atoms), and furthermore, in addition, it is more preferable that the acid value be 25 to 95 and the weight average molecular weight be 5,000 to 150,000.

Specific examples of the water-insoluble polymer configuring the self-dispersing polymer particles include a phenoxyethyl acrylate/methyl methacrylate/acrylic acid copolymer (50/45/5), a phenoxyethyl acrylate/benzyl methacrylate/isobutyl methacrylate/methacrylic acid copolymer (30/35/29/6), phenoxy ethyl methacrylate/isobutyl methacrylate/methacrylic acid copolymer (50/44/6), phenoxyethyl acrylate/methyl methacrylate/ethyl acrylate/acrylic acid copolymer (30/55/10/5), benzyl methacrylate/isobutyl methacrylate/methacrylic acid copolymer (35/59/6), styrene/phenoxyethyl acrylate/methyl methacrylate/acrylic acid copolymer (10/50/35/5), benzyl acrylate/methyl methacrylate/acrylic acid copolymer (55/40/5), phenoxy ethyl methacrylate/benzyl acrylate/methacrylic acid copolymer (45/47/8), styrene/phenoxyethyl acrylate/butyl methacrylate/acrylic acid copolymer (5/48/40/7), benzyl methacrylate/isobutyl methacrylate/cyclohexyl methacrylate/methacrylic acid copolymer (35/30/30/5), phenoxyethyl acrylate/methyl methacrylate/butyl acrylate/methacrylic acid copolymer (12/50/30/8), benzyl acrylate/isobutyl methacrylate/acrylic acid copolymer (93/2/5), styrene/phenoxy ethyl methacrylate/butyl acrylate/acrylic acid copolymer (50/5/20/25), styrene/butyl acrylate/acrylic acid copolymer (62/35/3), methyl methacrylate/phenoxyethyl acrylate/acrylic acid copolymer (45/51/4), methyl methacrylate/phenoxyethyl acrylate/acrylic acid copolymer (45/49/6), methyl methacrylate/phenoxyethyl acrylate/acrylic acid copolymer (45/48/7), methyl methacrylate/phenoxyethyl acrylate/acrylic acid copolymer (45/47/8), methyl methacrylate/phenoxyethyl acrylate/acrylic acid copolymer (45/45/10), and the like. The contents of the parentheses represent the mass ratio of copolymerization components.

The average particle diameter of the polymer particles is preferably in a range of 1 nm to 70 nm by volume average particle diameter, and any of a pigment with a wide particle diameter distribution or a pigment with a monodispersed particle diameter distribution is sufficient. The average particle diameter and particle diameter distribution are measured with a dynamic light scattering method using a particle size distribution measuring instrument NANOTRAC UPA-EX150 (manufactured by Nikkiso Co., Ltd.).

In addition, the glass transition temperature (Tg) of the self-dispersing polymer particles is preferably 70° C. or more, more preferably 80° C. or more, and even more preferably 100° C. or more. When the glass transition temperature (Tg) is 70° C. or more, resistance to local blocking is improved.

Other Components

The ink composition in the present invention can be configured to use other additives other than the above-described components. Examples of the other additives include known additives such as a polymerization inhibitor, an anti-drying agent (wetting agent), an anti-fading agent, an emulsion stabilizer, a permeation enhancer, an ultraviolet absorbing agent, a preservative, a fungicide, a pH adjusting agent, a surface tension adjusting agent, an anti-foaming agent, a viscosity adjusting agent, a dispersion stabilizer, an anti-rust agent, a chelating agent, or the like. The various additives are generally added directly to the ink in the case of the ink composition and added to a dispersant after a dye dispersant is prepared in a case where an oil-based dye is used as a dispersant; however, the additives may be added to an oil phase or an aqueous phase during the preparation.

Drying Step

In the drying step of the present invention, at least a part of the water and at least a part of the water-soluble organic solvent are removed by drying from the image (ink composition) formed on the recording medium due to the application of the ink composition in the ink application step. The drying step is provided before the curing step to be described later and the curing reaction of the polymerizable compound progressed more favorably in the curing step by the content of the water and the water-soluble organic solvent in the ink composition being reduced. In particular, sensitivity can be secured in which image formability is established in a case of image forming at high speed, such as a method of image forming according to a single pass method in which one line is formed by discharging ink one time with regard to a direction (the arrangement direction of the recording element) intersecting the transport direction of the recording medium.

For example, the effect of the invention is more evident in a case of image forming where the transport speed of the recording medium is 100 to 3000 mm/s, and furthermore, the effect of improving the adhesion and scratch resistance is excellent due to the providing of the drying in a case where the transport speed is 150 to 2700 mm/s and more preferably is 250 to 2500 mm/s.

In the drying step of the present invention, it is not necessary for the water and the water-soluble organic solvent to be necessarily completely dried and the water and the water-soluble organic solvent may remain in the image and in the pigment layer. In the drying step, it is instead preferable that there is drying to an extent that the water and the water-soluble organic solvent remain in a range where the UV curing reaction does not deteriorate.

In the drying step, in the water included in the ink composition (image) to which the maximum amount is applied, it is preferable that at least a part of the water included in the ink composition applied on the recording medium in the ink application step be removed under drying conditions (below, referred to as "drying amount") in which 60 to 80 mass % is removed. When the amount of the removed water is 60 mass % or more, cockling can be suppressed and the adhesion of the image can be favorably maintained. In addition, when the amount of the removed water is 80 mass % or less, the adhesion of the image is favorable.

The drying conditions may be set based on the maximum application amount of the ink composition in the ink application step which is appropriately set as necessary. The generation of cockling is suppressed and an image with excellent adhesion is obtained due to the water in the ink composition including a pigment being removed under these drying conditions.

The drying amount in the drying step can be calculated as follows. That is, a water amount $W_0$ included in the image formed using the maximum ink application amount without the drying step being provided and a water amount $W_1$ included in the image formed using the maximum ink application amount with the drying step being provided according to predetermined drying conditions, are respectively measured. Next, by determining the difference of $W_0$ and $W_1$ and the ratio $((W_0-W_1)/W_0 \times 100$ [mass %]) with respect to $W_0$, the drying amount (mass %) is calculated as the water amount removed by the drying step.

Here, the water amount included in the image is measured using the Karl Fischer method. As the water amount in the present invention, a water amount measured under normal measuring conditions using a Karl Fischer moisture meter MKA-520 (manufactured by Kyoto Electronic Manufacturing Co., Ltd.) is applied.

The water amount (drying amount) in the ink composition which is removed in the drying step is preferably 60 to 80 mass %, more preferably 65 to 80 mass %, and even more preferably 70 to 80 mass % with respect to the total water amount of the ink composition applied with the maximum application amount as 15 ml/m² from the viewpoint of the curing efficiency after drying being favorably maintained.

In addition, the drying is preferably started within 5 seconds from the point in time of the landing of the liquid droplets of the ink composition on the recording medium. Here, "within 5 seconds from the point in time of the landing" signifies that wind is blown or heat is applied to the image within 5 seconds from the landing time of the ink droplets. For example, by transporting the recording medium inside the drying region within 5 seconds from the landing of the ink droplets, the drying is started within 5 seconds from the landing.

The time until the starting of the drying from the landing of the ink droplets is more preferably within 3 seconds.

The drying is performed using heating means heating using a heat generator such as a nichrome wire heater, wind blowing means using wind such as a dryer, or means where these are used in combination. Examples of the heating method include a method where heat is supplied by a heater or the like from an opposite side to the image forming surface of the recording medium, a method where a warm wind or a hot wind is blown against the image forming surface of the recording medium, a heating method using infrared heater, or the like. The heating may be performed by a plurality of these in combination.

Curing Step

In the curing step in the present invention, curing is carried out by irradiating active energy rays with respect to the formed image after the drying step. Due to the irradiation of the active energy rays, the polymerizable compound in the ink composition is polymerized and a curing film including the pigment is formed. In this manner, the abrasion resistance of the formed image is further improved.

The active energy rays are not particularly limited as long as the polymerizable compound can be polymerized. Examples thereof include ultraviolet rays, electron beams, and the like, and, among these, from the viewpoint of versatility, ultraviolet rays are preferable. In addition, examples of the generation source of the active energy rays include an ultraviolet irradiation lamp (halogen lamp, high-pressure mercury lamp, and the like), a laser, an LED, an electron beam irradiation apparatus, or the like.

As the means of irradiating the ultraviolet rays, means which is normally used may be used, and, in particular, an ultraviolet ray irradiating lamp is suitable. As the ultraviolet ray irradiating lamp, a so-called low-pressure mercury lamp where the vapor pressure of the mercury is 1 to 10 Pa during lighting, a low-pressure mercury lamp, a high-pressure mercury lamp, a mercury lamp coated with a phosphorous body, a UV-LED light source, and the like are suitable. The light spectrum in the ultraviolet region of the mercury lamps and the UV-LED is 450 nm or less and is particularly in the range of 184 nm to 450 nm, and is appropriate for efficiently causing a reaction in the polymerizable compound in an ink composition which is black or colored. In addition, in terms of the mounting of the power source in a printer, a power source with a small size is appropriate from the viewpoint of usability. As a mercury lamp, for example, a metal halide lamp, a high-pressure mercury lamp, an ultra-high pressure mercury lamp, a xenon flash lamp, a deep UV lamp, a lamp where a mercury lamp is excited with no electrodes from the outside using microwaves, a UV laser, and the like may be applied. Since the above-described range includes the light wavelength region, application can basically be made as long as the size of the power source, the input strength, the lamp shape, and the like permit. The light source is selected in combination with the sensitivity of the polymerization initiator which is used.

The illuminance of the active energy rays in the present invention is set to 1 W/cm² or more and 2 W/cm² or less in the wavelength region which is effective in curing. When the illuminance is too weak and does not satisfy 1 W/cm², gloss unevenness such as clouding and adhesion insufficiency of the image to the recording medium are not eliminated, and a high-quality image having fastness properties cannot be obtained. In addition, that the illuminance is 2 W or less indicates that an image with good adhesion (curing sensitivity) can be obtained while suppressing the gloss unevenness in the image even at low illuminance. In the present invention, by the illuminance being 2 W/cm$^2$ or less, the generation of gloss unevenness such as clouding is suppressed, and it is possible to obtain a good adhesion property. In addition, it does not become a factor causing damage to the recording medium or discoloration of the coloring material.

Treatment Liquid Application Step

In addition to the above, the image forming method of the present invention preferably has a treatment liquid application step of applying a treatment liquid, which includes an aggregation component aggregating components in the ink composition when coming into contact with the ink composition, onto the recording medium. By applying the treatment liquid aggregating the components in the ink composition, a detailed image is easily obtained at a high density, whereby gloss unevenness easily appears; however, in the present invention, the gloss unevenness and the adhesion defects can be suppressed even in a system using the treatment liquid. In addition, the above-described drying effect can be more favorably exhibited.

The treatment liquid applied onto the medium forms an image by coming into contact with the ink composition. In this case, dispersant particles such as the pigment, the polymer particles, and the like in the ink composition aggregate and the image is fixed on the recording medium.

The application of the treatment liquid can be performed by applying a known method such as a coating method, an ink jet method, or an immersion method. The coating method is able to be performed using a known coating method using a direct gravure coater, an offset gravure coater, an extrusion die coater, an air doctor coater, a blade coater, a rod coater, a knife coater, a squeeze coater, a reverse roll coater, a bar coater, or the like. Details of the ink jet method are as described earlier.

The treatment liquid application step may be provided either before or after the ink application step using the ink composition. In the present invention, an aspect in which the ink application step is provided after applying the treatment liquid in the treatment liquid application step is preferable. Specifically, an aspect is preferable in which the treatment liquid for aggregating the pigment and/or the polymer particles in the ink composition is applied onto the recording medium in advance and an image is made by applying the ink composition so as to come into contact with the treatment liquid applied onto the recording medium. In this manner, the drying effect is further improved, the image forming is sped up, and an image with high density and resolution can be obtained even with image forming at a high speed.

While the application amount of the treatment liquid is not particularly limited as long as the ink composition can be aggregated, it is preferable to set the application amount of the aggregation component to 0.1 g/m$^2$ or more. In particular, the application amount of the aggregation component is preferably 0.2 to 0.7 g/m$^2$. When the application amount of the aggregation component is 0.1 g/m$^2$ or more, favorable high-speed aggregation ability can be maintained according to various usage aspects of the ink composition. In addition, it is preferable that the application amount of the aggregation component be 0.7 g/m$^2$ or less in order that the surface property of the applied recording medium is not negatively affected (change in gloss, or the like).

In addition, in the present invention, after providing the ink application step after the treatment liquid application step and applying the treatment liquid on the recording medium, while the ink composition is being applied, it is preferable to further provide a heat drying step of heating and drying the treatment liquid on the recording medium.

By heating and drying the treatment liquid in advance before the ink application step, the ink coloring ability such as bleeding prevention becomes favorable, and a visible image with favorable color density and color phase can be recorded.

The heating and drying is performed through known means for heating such as a heater, wind blowing means using wind such as a dryer, or means combining the two. Examples of the heating method include a method of heating using a heater or the like from the opposite side to the application surface of the treatment liquid on the recording medium, a method of directing warm air or hot air on the application surface of the treatment liquid on the recording medium, a heating method using an infrared heater, and the like, or heating may be carried out by combining a plurality of these methods.

Treatment Liquid

The ink composition of the present invention may be appropriately used as an ink set in combination with the treatment liquid including the aggregation component which forms an aggregate body by aggregating the components in the ink composition when coming into contact with the ink composition.

The treatment liquid in the present invention includes at least the aggregation component aggregating the component in the ink composition which has already been described, and preferably further includes the polymerization initiator. In addition, the treatment liquid can be configured using other further components as required. By an image being formed using the treatment liquid along with the application of the ink composition, the ink jet recording can be sped up, and in addition, an image in which the drawing is superior with high density and resolution (for example reproduction of fine lines and ultra-fine portions) can be obtained even with high-speed recording.

The aggregation component may be a compound which is able to change the pH of the ink composition, may be a multivalent metal salt, or may be a cationic polymer.

From the viewpoint of the aggregability of the ink composition, a compound that can change the pH of the ink composition is preferable, and a compound that can reduce the pH of the ink composition is more preferable. Examples of the compound which is able to reduce the pH of the ink composition can include an acidic substance. Preferable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivative compounds of these, salts of these, or the like. One acidic substance may be used alone or a combination of two or more may be used.

In a case where the treatment liquid includes the acidic substance, the pH of the treatment liquid (25° C.) is preferably 6 or less, the pH is more preferably 4 or less, the pH is even more preferably in the range of 1 to 4, and the pH is particularly preferably 1 to 3. At this time, the pH (25° C.) of the ink composition is preferably 7.5 or more (more preferably 8.0 or more). In particular, from the viewpoints of image density, resolution, and high-speed ink jet recording, a case where the pH of the ink composition (25° C.) is 8.0 or more and the pH of the treatment liquid (25° C.) is 0.5 to 4 is preferable.

In particular, an acidic substance with high water solubility is preferable as the aggregation component of the present invention, and in terms of increasing the aggregability and fixing the entirety of the ink, an organic acid is preferable, a divalent or higher organic acid is more preferable, and a divalent or higher and trivalent or lower acidic substance is particularly preferable. As the divalent or higher organic acid, an organic acid having a first pKa of 3.5 or less is preferable, and an organic acid having 3.0 or less is more preferable. Specifically, suitable examples include phosphoric acid, oxalic acid, malonic acid, citric acid and the like.

Polyvalent metal salts, which can be used as the aggregating component, and cationic polymers are described in detail in paragraph numbers [0155] to [0156] of JP2011-042150A, and these are also suitable for the present invention.

The aggregation component is able to be used as one type singly or by mixing two or more types.

The content amount of the aggregation component that aggregates the ink composition in the treatment liquid is preferably 1 to 50 mass %, more preferably 3 to 45 mass %, and even more preferably within a range of 5 to 40 mass %.

The treatment liquid can contain at least one type of the polymerization initiator which initiates polymerization of the polymerizable compound in the ink composition using active energy rays with or without being contained in the ink composition. One type of polymerization initiator may be used singly, two or more types may be mixed, or a polymerization initiator may be used along with a sensitizer.

Similarly to the ink composition, the polymerization initiator which is used in the treatment liquid can be appropriately selected from compounds which can initiate a polymerization reaction of the polymerizable compound using active energy rays. Examples of polymerization initiators include polymerization initiators (for example, photopolymerization initiators and the like) that generate active species (radicals, acids, bases, and the like) using radiation, light, or electron beams. The details of the photopolymerization initiator and the like are as described in the section of the ink composition.

In the present invention, the polymerization initiator may be contained in the ink composition, the treatment liquid, or both; however, an aspect where the polymerization initiator is contained in at least the ink composition is preferable from the point of the polymerization reaction and the curing, and subsequently, the viewpoint of an effect of improving the adhesion and the scratch resistance of the image.

In addition, the treatment liquid may further contain other additives as other components in a range which does not deteriorate the effect of the present invention. Examples of the other additives include known additives such as a drying prevention agent (lubricating agent), an anti-fading agent, an emulsion stabilizer, a permeation enhancer, an ultraviolet absorbing agent, a preservative, a fungicide, a pH adjusting agent, a surface tension adjusting agent, an anti-foaming agent, a viscosity adjusting agent, a dispersing agent, a dispersion stabilizer, an anti-rust agent, or a chelating agent.

Ink Jet Recording Apparatus

Next, an example of an ink jet recording apparatus which is suitable for realizing the image forming method of the present invention will be specifically described with reference to FIG. 1. FIG. 1 is a schematic configuration view showing a configuration example of the entire ink jet recording apparatus.

As shown in FIG. 1, the ink jet recording apparatus is provided with a treatment liquid application unit 12 provided with a treatment liquid ejecting head 12S which ejects treatment liquid; a treatment liquid drying zone 13 provided with heating means (not shown) for drying the applied treatment liquid; an ink ejecting unit 14 which ejects each type of the ink composition; and an ink drying zone 15 drying the ejected ink composition, sequentially in the transport direction of the recording medium (in the direction of the arrow in the diagram). In addition, an ultraviolet ray irradiation unit 16 provided with an ultraviolet ray irradiation lamp 16S is provided at a downstream side of the ink drying zone 15 in the transport direction of the recording medium.

The recording medium which is supplied to the ink jet recording apparatus is sent in order to the treatment liquid application unit 12, the treatment liquid drying zone 13, the ink ejecting unit 14, the ink drying zone 15, and the ultraviolet ray irradiation unit 16 using transport rollers from a feeding unit which feeds the recording medium from a case which is filled with the recording media, and is accumulated in an accumulation unit. Other than the method using the transport rollers, a drum transporting method using a drum shaped member, a belt transporting method, a stage transport method using a stage, or the like may be adopted in the transporting.

Out of the plurality of transport rollers which are arranged, at least one of the rollers is able to be a driving roller transmitting the power of a motor (not shown). The recording medium is transported by a predetermined transport amount in a predetermined direction by rotating the driving roller at a set speed with the motor.

The treatment liquid ejecting head 12S which is linked to a storage tank which stores the treatment liquid is provided in the treatment liquid application unit 12. The treatment liquid ejecting head 12S is set so as to be able to eject treatment liquid from ejection nozzles arranged opposite to the recording surface of the recording medium and to be able to apply the treatment liquid as liquid droplets onto the recording medium. Here, the treatment liquid application unit 12 is not limited to the method of ejecting from a head with a nozzle shape and a coating method using a coating roller can be adopted. This coating method is capable of easily applying treatment liquid to approximately the whole surface including the image region where the ink droplets are landed on the recording medium by the ink ejecting unit 14 arranged at the downstream side. In order for the thickness of the treatment liquid on the recording medium to be constant, for example, a method may be provided such as arranging a member using an air knife or having a sharp corner to provide a gap with the recording medium which corresponds to a regulation amount of the treatment liquid.

The treatment liquid drying zone 13 is arranged at the downstream side in the recording medium transport direction of the treatment liquid application unit 12. The treatment liquid drying zone 13 can be configured by using well-known heating means such as a heater, air-blowing means using blown air such as a dryer, or a combination of these. Examples of the heating method include a method where a heat generator such as a heater is arranged at an opposite side to a cut-off layer forming surface of the recording medium (for example, below the transport mechanism transporting the mounted recording medium in a case where the recording medium is automatically transported), a method where a warm wind or a hot wind is blown against a cut-off layer forming surface of the recording medium, and a heating method where an infrared heater is used, and the heating may be performed by combining a plurality of these.

In addition, since the surface temperature of the recording medium changes due to the type of recording medium (material, thickness, and the like), the ambient temperature, and the like, it is preferable that a cut-off layer be formed while the temperature is controlled by providing a measuring unit measuring the surface temperature of the recording medium and a control mechanism where a value of the surface temperature of the recording medium measured by the measuring unit is fed back to a heating control unit. As the measuring unit measuring the surface temperature of the recording medium, a contact or non-contact thermometer is preferable.

In addition, solvent removal using a solvent removal roller or the like may be performed. As other aspects, a method of removing excess solvent from the recording medium with an air knife may be used.

The ink ejecting unit 14 is arranged at the downstream side in the recording medium transport direction of the treatment liquid drying zone 13. Recording heads (ink ejecting heads) 30K, 30C, 30M, and 30Y which are respectively linked to ink storage units storing each color of ink of black (K), cyan (C), magenta (M), and yellow (Y) are arranged in the ink ejecting unit 14. Ink compositions, which contain pigments corresponding to each color phase, resin particles, the water-soluble organic solvent, and water, are stored in each of the ink storage units which are not shown and are supplied to the respective ink ejecting heads 30K, 30C, 30M, and 30Y as required when recording an image. In addition, recording heads 30A and 30B for ejecting specialized ink as shown in FIG. 1 can be further provided in the downstream side of the ink ejecting heads 30K, 30C, 30M, and 30Y in the transport direction in order that specialized ink can be discharged as necessary.

The ink ejecting heads 30K, 30C, 30M, and 30Y eject inks corresponding to the respective images from the ejection nozzles arranged opposite to the recording surface of the recording medium. In this manner, each color of ink is applied onto the recording surface of the recording medium and a color image is recorded.

The treatment liquid ejecting head 12S and the ink ejecting heads 30K, 30C, 30M, 30Y, 30A and 30B are all full line heads in which a large number of ejection holes (nozzles) are lined up across the maximum recording width of the image to be recorded on the recording medium. Image recording can be performed on the recording medium at a high speed in comparison with a serial type where recording is performed while a shuttle head with short dimensions scans back and forth in the width direction of the recording medium (a direction which is orthogonal to the transport direction in the transport surface of the recording medium). In the present invention, a method which is capable of recording with a serial type or comparatively high-speed recording, for example, any recording with a method capable of ejecting and recording in the arrangement direction of recording elements with a single pass forming one line with one discharge may be adopted; however, according to the image recording method of the present invention, a high-quality image with good reproducibility may be obtained even with a method using a single pass.

Here, the treatment liquid ejecting head 12S and the ink ejecting heads 30K, 30C, 30M, 30Y, 30A and 30B all have the same structure.

The application amount of the treatment liquid and the application amount of the ink composition are preferably adjusted as necessary. For example, for the adjustment and the like of physical properties such as the viscoelasticity of aggregates in which the treatment liquid and the ink composition can be mixed, the application amount of the processing liquid may be changed according to the recording medium.

The ink drying zone 15 is arranged on the recording medium transport direction downstream side of the ink ejecting unit 14. The ink drying zone 15 can be configured similarly to the treatment liquid drying zone 13.

The ultraviolet irradiation unit 16 is arranged further to a downstream side of the ink drying zone 15 in the transport direction of the recording medium, irradiates ultraviolet rays using the ultraviolet ray irradiation lamp 16S provided in the ultraviolet irradiation unit 16, and polymerizes and cures the monomer components in the image after the drying of the image. The ultraviolet ray irradiation lamp 16S irradiates the entirety of the recording surface using the lamp arranged opposite to the recording surface of the recording medium and is set to be able to perform curing of the entire image. Here, the ultraviolet ray irradiation unit 16 is not limited to the ultraviolet ray irradiation lamp 16S and is able to adopt a halogen lamp, high-pressure mercury lamp, a laser, an LED, an electron irradiation apparatus, or the like. The ultraviolet ray irradiation unit 16 may be arranged either before or after the ink drying zone 15 and may be arranged both before and after the ink drying zone 15.

In addition, heating means for carrying out a heating process on the recording medium can be arranged in the transport path from a feeding unit to the accumulation unit in the ink jet recording apparatus. For example, by arranging the heating means at a desired position such as the upstream side of the treatment liquid drying zone 13 or between the ink ejecting unit 14 and the ink drying zone 15 and heating the recording medium to a desired temperature, drying and fixing can be effectively performed.

Examples

Below, the present invention will be described in more detail using examples; however, the present invention is not limited to the following examples as long as it does not exceed the gist thereof. Here, unless otherwise specified, "parts" are by mass.

Preparation of Polymeric Dispersing Agent 1 Solution 6 parts of styrene, 11 parts of stearyl methacrylate, 4 parts of styrene macromer AS-6 (trade name, manufactured by Toagosei Co., Ltd.), 5 parts of Blemmer PP-500 (trade name, manufactured by Nippon Oil & Fats Co., Ltd.), 5 parts of methacrylic acid, 0.05 parts of 2-mercaptoethanol and 24 parts of methyl ethyl ketone were added to a reaction vessel, and a mixed solution was prepared. On the other hand, 14 parts of styrene, 24 parts of stearyl methacrylate, 9 parts of styrene macromer AS-6 (trade name, manufactured by Toagosei Co., Ltd.), 9 parts of Blemmer PP-500 (trade name, manufactured by Nippon Oil & Fats Co., Ltd.), 10 parts of methacrylic acid, 0.13 parts of 2-mercaptoethanol, 56 parts of methyl ethyl ketone and 1.2 parts of 2,2'-azobis(2,4-dimethylvaleronitrile) were added to a dropping funnel and a mixed solution was prepared.

Then, the mixed solution in the reaction vessel was heated to 75° C. under a nitrogen atmosphere while stirring and the mixed solution in the dropping funnel was gradually dropped over 1 hour. Two hours after the completion of the dropping, a solution obtained by dissolving 1.2 parts of 2,2'-azobis(2, 4-dimethylvaleronitrile) in 12 parts of methyl ethyl ketone was dropped over 3 hours, followed by further aging for 2 hours at 75° C. and for 2 hours at 80° C., whereby a polymeric dispersing agent 1 solution was obtained.

The solvent was removed from a part of the obtained polymeric dispersing agent 1 solution to obtain a solid content. The obtained solid content was diluted to 0.1% by mass with tetrahydrofuran, followed by measuring the weight average molecular weight using a high-speed GPC (gel permeation chromatography) HLC-8220GPC with three of TSKgeL Super HZM-H, TSKgeL Super HZ4000 and TSKgeL Super HZ2000 (manufactured by Tosoh Corporation) connected in series. The measured weight average molecular weight was 25,000 on polystyrene conversion. In addition, the acid value of the polymer calculated using the method disclosed in Japanese Industrial Standard (JIS K 0070:1992) was 99 mgKOH/g.

Preparation of Pigment Dispersing Agent M 5.0 g (as solid content) of the obtained polymeric dispersing agent 1 solution, 10.0 g of magenta pigment (Pigment Red 122, manufactured by Dainichiseika Color and Chemicals Mfg. Co., Ltd.), 40.0 g of methyl ethyl ketone, 8.0 g of 1 mol/L (liter; same applies below) sodium hydroxide aqueous solution, and 82.0 g of ion-exchanged water, were supplied to a vessel along with 300 g of 0.1 mm zirconia beads, and dispersed at 1000 rpm for 6 hours using a ready mill disperser (manufactured by Aimex Co., Ltd.). The obtained dispersion solution was subjected to reduced pressure condensation with an evaporator until the methyl ethyl ketone could be sufficiently distilled away, then further condensed until the pigment density reached 10% by mass, whereby a pigment dispersion solution M of a resin coating magenta pigment was prepared.

A volume average particle diameter (secondary particle) of the obtained pigment dispersion solution M was 84 nm when measured using a dynamic light scattering method with a Microtrac particle size distribution measurement apparatus (trade name: Verison 10.1.2-211BH, manufactured by Nikkiso, Co., Ltd.).

Preparation of Pigment Dispersion Solution Y

A pigment dispersion solution Y of a resin coating yellow pigment was obtained in the same manner as the preparation of the pigment dispersion solution M, except that, in the preparation of the pigment dispersion solution M, Irgalite Yellow GS (pigment yellow 74, BASF Japan Co., Ltd.) was used instead of the Pigment Red 122 used as the pigment. The volume average particle diameter (secondary particles) of the pigment dispersion solution Y measured in the same manner as the pigment dispersion solution M was 75 nm.

Preparation of Pigment Dispersion Solution C

As the pigment dispersion solution C, CABO-JET250C (Pigment Blue 15:4 (PB15:4); cyan dispersion solution manufactured by Cabot, Corp.) was prepared. The pigment dispersion solution C is a pigment dispersion solution of a resin coating cyan pigment in which PB15:4 is coated with a resin. The volume average particle diameter (secondary particles) of the pigment dispersion solution C measured in the same manner as the pigment dispersion solution M was 110 nm.

Synthesis of Polyvalent (Meth)Acrylamide B-1

First Step 121 g (1 equivalent) of tris(hydroxymethyl) aminomethane (manufactured by Tokyo Kasei Kogyo Co., Ltd.), 84 ml of a 50 mass % potassium hydroxide aqueous solution, and 423 ml of toluene were added to a 1 L three-neck flask provided with a stirrer bar, stirring was performed, the resultant was maintained at 20 to 25° C. in a reaction system in a water bath, and 397.5 g (7.5 equivalents) of acrylonitrile were added dropwise thereto over 2 hours. After the dropwise addition, stirring was performed for 1.5 hours. Thereafter, 540 ml of toluene was added in the reaction system, and the reaction mixture was transferred to a separatory funnel and an aqueous layer removed. After drying the remaining organic layer over magnesium sulfate, by performing Celite filtering and subsequently distilling off the solvent under reduced pressure, an acrylonitrile adduct was obtained. Since the analysis results according to $^1$H-NMR, MS of the obtained material showed a good agreement with known compounds, the material was used in the following reduction reaction without further purification.

Second Step 24 g of the obtained acrylonitrile adduct, 48 g of the Ni catalyst (Raney nickel 2400, manufactured by W. R. Grace & Co. Ltd.), and 600 ml of 25 mass % ammonia aqueous solution (water:methanol=1:1) were added to an autoclave with a volume of 1 L, and the reaction vessel was sealed after performing suspension. Hydrogen of 10 Mpa was introduced into the reaction vessel, and a reaction was caused for 16 hours with a reaction temperature of 25° C.

The disappearance of the raw material was confirmed by $^1$H-NMR, the reaction mixture was filtered with Celite, and the Celite was washed several times with methanol. By distilling off the solvent from the filtrate under reduced pressure, a polyamine body was obtained. The obtained material was used in the next reaction without further purification.

Third Step 30 g of the obtained polyamine body, 120 g (14 equivalents) of NaHCO$_3$, 1 L of dichloromethane, and 50 ml of water were added to a three-neck flask with a volume of 2 L provided with a stirrer, and 92.8 g (10 equivalents) of acrylic acid chloride were added dropwise thereto over 3 hours under an ice bath. Thereafter, stirring was performed at room temperature for 3 hours. After the disappearance of the raw material was confirmed by $^1$H-NMR, the solvent was distilled off from the reaction mixture under reduced pressure. Subsequently, the reaction mixture was dried over magnesium sulfate, Celite filtering was performed and the solvent was then distilled off under reduced pressure. Finally, by performing purification with column chromatography (ethyl acetate/methanol=4:1), a solid of polyvalent (meth)acrylamide B-1 (in the General Formula (2), $R^1$=H $R^2$=C$_3$H$_6$ $R^3$=CH$_2$, X=Y=Z=0) at ambient temperature was obtained. The yield of polyvalent (meth)acrylamide B-1 obtained through the above-described three steps was 40 mass %.

[Chem. 12]

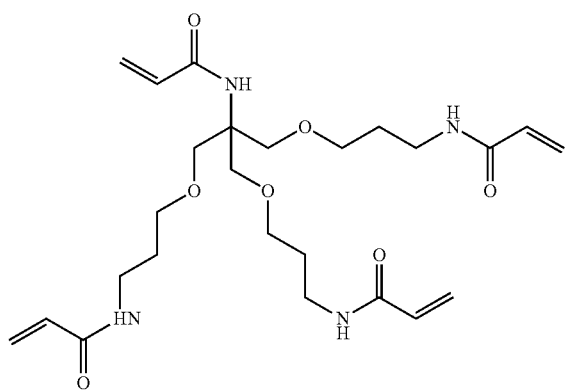

B-1

Synthesis of Polymerizable Monomers (B-2) to (B-5)

According to the synthesis procedure of the polyvalent (meth)acrylamide B-1, polyvalent (meth)acrylamides B-2 to B-5 having the following structures were synthesized.

[Chem. 13]

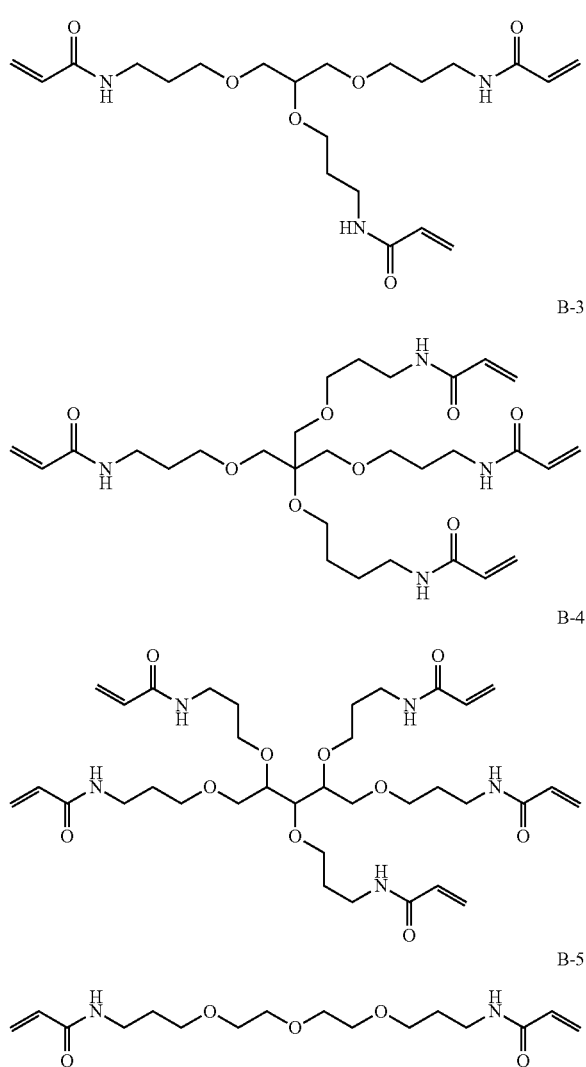

Preparation of Self-Dispersing Polymer Particles 360.0 g of methyl ethyl ketone was added into a 2 liter three-necked flask provided with a stirrer, a thermometer, a reflux condenser and a nitrogen gas introducing tube, followed by heating up to 75° C. Thereafter, maintaining the temperature inside the flask at 75° C., a mixed solution formed of 180.0 g of phenoxyethyl acrylate, 162.0 g of methyl methacrylate, 18.0 g of acrylic acid, 72 g of methyl ethyl ketone and 1.44 g of "V-601" (trade name, manufactured by Wako Pure Chemical Industries, Ltd.) was dropped at a constant speed in order to complete the dropping in two hours. After the completion of the dropping, a solution containing 0.72 g of "V-601" and 36.0 g of methyl ethyl ketone was added thereto, followed by stirring at 75° C. for 2 hours, further followed by adding a solution formed of 0.72 g of "V-601" and 36.0 g of isopropanol and stirring at 75° C. for 2 hours. Thereafter, heating was performed to 85° C. and stirring was further continued for 2 hours, whereby a phenoxyethyl acrylate/methyl methacrylate/acrylate (=50/45/5 [mass ratio]) copolymer resin solution was obtained.

The weight average molecular weight (Mw) of the obtained copolymer was measured in the same manner as the above-described polymeric dispersing agent 1 and was 64,000 (calculated by polystyrene conversion using gel permeation chromatography (GPC)) and the acid value was 38.9 mgKOH/g.

Next, 668.3 g of the obtained resin solution was weighed, 388.3 g of isopropanol and 145.7 ml of 1 mol/L NaOH aqueous solution were added thereto and the temperature inside the reaction vessel was raised to 80° C. Next, after 720.1 g of distilled water was dropped at a speed of 20 ml/minute to perform water dispersion, the temperature inside the reaction vessel was kept at 80° C. for 2 hours, at 85° C. for 2 hours and at 90° C. for 2 hours under atmospheric pressure, subsequently, the inside of the reaction vessel was depressurized to distil away a total of 913.7 g of isopropanol, methyl ethyl ketone and distilled water, whereby an aqueous dispersion P-1 of self-dispersing resin particles having a solid content density of 28.0% by mass was obtained.

Preparation of Ink Composition

After mixing the components shown in the following Table 1, coarse particles were removed through a membrane filter (pore size 5 μm), and ink compositions 1 to 14 were prepared. Here, "-" in the Table represents "not contained".

TABLE 1

| Ink No. | Pigment Dispersion Solution (pigment solid content) | | | Monofunctional polymerizable monomer | Polyvalent (meth)acrylamide (polyfunctional polymerizable monomer) | | | | | Polyfunctional polymerizable monomer | |
|---|---|---|---|---|---|---|---|---|---|---|---|
| | M | C | Y | A-1 | B-1 | B-2 | B-3 | B-4 | B-5 | C-1 | C-2 |
| 1 | 4 | — | — | 20 | 10 | — | — | — | — | — | — |
| 2 | 4 | — | — | 20 | — | 10 | — | — | — | — | — |
| 3 | 4 | — | — | 20 | — | — | 10 | — | — | — | — |
| 4 | 4 | — | — | 20 | — | — | — | 10 | — | — | — |
| 5 | 4 | — | — | 20 | — | — | — | — | 10 | — | — |
| 6 | — | 4 | — | 20 | 10 | — | — | — | — | — | — |
| 7 | — | — | 4 | 20 | 10 | — | — | — | — | — | — |
| 8 | 4 | — | — | 27 | 3 | — | — | — | — | — | — |
| 9 | 4 | — | — | 25 | 5 | — | — | — | — | — | — |
| 10 | 4 | — | — | 15 | 15 | — | — | — | — | — | — |
| 11 | 4 | — | — | 20 | 9 | — | — | — | — | 1 | — |
| 12 | 4 | — | — | 20 | 9 | — | — | — | — | — | 1 |
| 13 | 4 | — | — | 30 | | — | — | — | — | — | — |
| 14 | 4 | — | — | 29 | 1 | — | — | — | — | — | — |
| 15 | 4 | — | — | 13 | 17 | — | — | — | — | — | — |
| 16 | 4 | — | — | 10 | 20 | — | — | — | — | — | — |

TABLE 1-continued

| Ink No. | Polymerization initiator Irgacure 2959 | Self-dispersing polymer P-1 (Solid content) | Surfactant E1010 | Ion-exchanged Water | Notes |
|---|---|---|---|---|---|
| 1 | 3 | 1 | 1 | remaining amount bringing the total to 100% | Example |
| 2 | 3 | 1 | 1 | remaining amount bringing the total to 100% | Example |
| 3 | 3 | 1 | 1 | remaining amount bringing the total to 100% | Example |
| 4 | 3 | 1 | 1 | remaining amount bringing the total to 100% | Example |
| 5 | 3 | 1 | 1 | remaining amount bringing the total to 100% | Example |
| 6 | 3 | 1 | 1 | remaining amount bringing the total to 100% | Example |
| 7 | 3 | 1 | 1 | remaining amount bringing the total to 100% | Example |
| 8 | 3 | 1 | 1 | remaining amount bringing the total to 100% | Example |
| 9 | 3 | 1 | 1 | remaining amount bringing the total to 100% | Example |
| 10 | 3 | 1 | 1 | remaining amount bringing the total to 100% | Example |
| 11 | 3 | 1 | 1 | remaining amount bringing the total to 100% | Example |
| 12 | 3 | 1 | 1 | remaining amount bringing the total to 100% | Example |
| 13 | 3 | 1 | 1 | remaining amount bringing the total to 100% | Example |
| 14 | 3 | 1 | 1 | remaining amount bringing the total to 100% | Example |
| 15 | 3 | 1 | 1 | remaining amount bringing the total to 100% | Example |
| 16 | 3 | 1 | 1 | remaining amount bringing the total to 100% | Example |

\* The unit of numbers (content) in the Table is "mass %".
The details of the components in Table 1 are as follows.
Monofunctional polymerizable monomer A-1: hydroxyethyl acrylamide (manufactures by Kohjin Co., Ltd.)
Polyfunctional polymerizable monomer C-1: trimethylolpropane diallyl ether (Neoallyl (registered trademark) T-20, manufactured by Daiso Chemical Co., Ltd.)
Polyfunctional polymerizable monomer C-2: triallyl isocyanate (Taic (registered trademark), manufactured by Nippon Kasei Chemical Co., Ltd.)
Polymerization initiator: IRGACURE 2959 (manufactured by BASF Japan Co., Ltd.; 1-[4-(2-hydroxyethoxy)-phenyl]-2-hydroxy-2-methyl-1-propan-1-one)
Surfactant: Olfine E1010 (manufactured by Nissin Chemical Industry Co., Ltd.)
Preparation of Treatment Liquid 1
Components shown in the following compositions were mixed and the treatment liquid 1 was prepared. The pH of the treatment liquid 1 (25° C.) was set to 1.02. Here, the pH was measured while controlling the temperature to 25° C. using a pH meter WM-50EG manufactured by DKK-Toa Corporation.
Composition
Malonic acid ((component f) manufactured by Wako Pure Chemical Industries, Ltd.) 25 mass %
Diethylene glycol monomethyl ether (manufactured by Wako Pure Chemical Industries, Ltd.) 20 mass %
EMULGEN-P109 (manufactured by Kao Corp., non-ionic surfactant) 1%
Ion-exchanged water remaining about bringing the total to 100%

Image Formation and Evaluation
1. Image Forming
First, as shown in FIG. 1, an ink jet recording apparatus is prepared to be provided with the treatment liquid application unit 12 provided with the treatment liquid ejecting head 12S ejecting treatment liquid; the treatment liquid drying zone 13 drying the applied treatment liquid; the ink ejecting unit 14 ejecting each type of ink composition; the ink drying zone 15 drying the ejected ink composition; and the ultraviolet ray irradiation unit 16 provided with the ultraviolet ray irradiation lamp 16S capable of irradiating ultraviolet rays (UV), sequentially in the transport direction of the recording medium (in the direction of the arrow in the diagram).

The treatment liquid drying zone 13 is configured in order that an air blower performing drying by blowing drying air is provided in the recording surface side of the recording medium and an infrared heater is provided in the non-recording surface side of the recording medium, whereby 70 mass % or more of the water in the treatment liquid can be evaporated (dried) by adjusting the temperature and the air amount until 900 msec has passed since the starting of the application of the treatment liquid by the treatment liquid application unit. In addition, the ink ejecting unit 14 has a black ink ejecting head 30K, a cyan ink ejecting head 30C, a magenta ink ejecting head 30M, and a yellow ink ejecting head 30Y arranged in order in the transport direction (arrow direction), in which each head is a 1200 dpi (dot per inch)/10 inch width full line head (driving frequency 25 kHz, transport speed of recording medium: 500 mm/s), and is capable of recording by ejecting each color in a single pass in the main scanning direction.

The treatment liquid 1 obtained in the above description, the cyan ink, the magenta ink, and the yellow ink are respectively sequentially loaded into storage tanks (not shown) respectively linked to a treatment liquid ejecting head 12S, a cyan ink ejecting head 30C, a magenta ink ejecting head 30M, and a yellow ink ejecting head 30Y of the ink jet recording apparatus configured as shown in FIG. 1, and a solid image and a 1200 dpi line image are formed on the recording medium. At this time, the application amount of the treatment liquid to the recording medium was set to 1.5 ml/m². Here, as the recording medium, OK Top Coat+(basis weight 104.7 g; manufactured by Oji Paper Co., Ltd.) was used.

In addition, at the time of image forming, the cyan ink, the magenta ink, and the yellow ink are ejected from the respective ejecting heads with a maximum ink application amount of 8 ml/m² after adjusting the resolution to 1200 dpi×1200 dpi and the ink droplet amount to 2.5 to 3.6 pl. The solid image is formed by ejecting ink onto the entire surface of a sample in which the recording medium is cut to A5 size.

Specifically, the image forming was performed under the conditions shown in the following Table.

First, treatment liquid was ejected from the treatment liquid ejecting head 12S onto the recording medium with a single pass, followed by drying the treatment liquid in the treatment liquid drying zone 13. At this time, the recording medium is set to pass through the treatment liquid drying zone before 900 msec has passed from the ejection start of the treatment liquid. In the treatment liquid drying zone 13, while heating the treatment liquid landed in droplets with an infrared heater from the rear side (back face) of the droplet landing face in order that the film surface temperature became 40 to 45° C., drying was performed on the recording surface for 5 seconds with warm air at 120° C. and 5 m/sec using an air blower. Subsequently, the cyan ink, magenta ink, and yellow ink are ejected in a single pass from the ejecting heads 30C, 30M, and 30Y filled with the cyan ink, magenta ink, and yellow ink, thereby forming an image. Thereafter, while heating with an infrared heater from the rear side (back face) of the ink droplet landing face in the same manner as in the ink drying zone 15, warm air of 120° C. was blown by an air blower, and drying was performed by changing the amount of air. At this time, the transport speed was adjusted in order that the time from the time point at which the ink droplets of each color was landed on the recording medium to the start of the drying at the ink drying zone 15 became 1 second. After image drying, in the UV irradiation unit 16, UV light (metal halide lamp manufactured by Eye Graphics Co., Ltd., maximum irradiation wavelength: 365 nm) was irradiated (total irradiation amount: 0.75 J/cm²) with the illuminance conditions shown in the following Table 2 by controlling the light source power and the transport speed, thereby curing the image.

2. Evaluation
2.1 Gloss Unevenness

The gloss unevenness of the ink image formed according to the above description was observed with the naked eye and evaluated according to the following evaluation criteria. The evaluation results are shown in the following Table 2.

Evaluation Criteria

A: a low gloss portion was not observed.

B: a slightly low gloss portion was observed to an extent; however, it was not of a level presenting a problem in practice.

C: a low gloss portion was uniformly distributed.

D: the entire surface of the image was a matte tone.

2-2. Adhesion

In a similar manner to the above-described evaluation of the gloss unevenness, samples in which an ink image is formed were prepared as described above. After sticking adhesive tape (Sellotape (registered trademark) serial number CT-12, manufactured by Nichiban Co., Ltd.) so as to be attached to the entire surface of the image forming surface of the samples, peeling off was immediately performed. The color transfer to the peeled tape and surface of the peeled portion of the sample were observed, and the adhesion was evaluated according to the following evaluation criteria.

Evaluation Criteria

TABLE 2

| | | Evaluation Illuminance [W/cm²] | | | | | | | | | | | |
|---|---|---|---|---|---|---|---|---|---|---|---|---|---|
| Ink | | 0.5 | | | | 1.0 | | | 1.3 | | | 1.5 | | |
| No. | Pigment | Gloss unevenness | Adhesion property | Notes | Gloss unevenness | Adhesion property | Notes | Gloss unevenness | Adhesion property | Notes | Gloss unevenness | Adhesion property | Notes |
| 1 (Example) | M | C | C | Comparative example | A | A | Example | A | A | Example | A | A | Example |
| 2 (Example) | M | C | C | Comparative example | B | B | Example | A | A | Example | A | A | Example |
| 3 (Example) | M | C | C | Comparative example | A | A | Example | A | A | Example | A | A | Example |
| 4 (Example) | M | C | C | Comparative example | A | A | Example | A | A | Example | A | A | Example |
| 5 (Example) | M | C | C | Comparative example | B | B | Example | B | B | Example | B | B | Example |

TABLE 2-continued

| No. | Pigment | Gloss unevenness | Adhesion property | Notes | Gloss unevenness | Adhesion property | Notes | Gloss unevenness | Adhesion property | Notes | Gloss unevenness | Adhesion property | Notes |
|---|---|---|---|---|---|---|---|---|---|---|---|---|---|
| 6 (Example) | C | C | C | Comparative example | A | A | Example | A | A | Example | A | A | Example |
| 7 (Example) | Y | C | C | Comparative example | A | A | Example | A | A | Example | A | A | Example |
| 8 (Example) | M | D | C | Comparative example | B | B | Example | B | B | Example | B | B | Example |
| 9 (Example) | M | D | C | Comparative example | B | B | Example | A | A | Example | A | A | Example |
| 10 (Example) | M | C | B | Comparative example | A | A | Example | A | A | Example | A | A | Example |
| 11 (Example) | M | C | C | Comparative example | A | A | Example | A | A | Example | A | A | Example |
| 12 (Example) | M | C | C | Comparative example | A | A | Example | A | A | Example | A | A | Example |
| 13 (Comparative example) | M | D | D | Comparative example | D | D | Comparative example | D | D | Comparative example | D | D | Comparative example |
| 14 (Comparative example) | M | D | D | Comparative example | D | D | Comparative example | D | D | Comparative example | C | C | Comparative example |
| 15 (Comparative example) | M | C | A | Comparative example | C | A | Comparative example | C | A | Comparative example | C | A | Comparative example |
| 16 (Comparative example) | M | C | A | Comparative example | C | A | Comparative example | C | A | Comparative example | C | A | Comparative example |

| | | Evaluation Illuminance [W/cm²] | | | | | | | | | | | |
|---|---|---|---|---|---|---|---|---|---|---|---|---|---|
| | | 1.7 | | | 2.0 | | | 2.5 | | | 3.5 | | |
| Ink No. | Pigment | Gloss unevenness | Adhesion property | Notes | Gloss unevenness | Adhesion property | Notes | Gloss unevenness | Adhesion property | Notes | Gloss unevenness | Adhesion property | Notes |
| 1 (Example) | M | A | A | Example | A | A | Example | A | A | Reference example | A | A | Reference example |
| 2 (Example) | M | A | A | Example | A | A | Example | A | A | Reference example | A | A | Reference example |
| 3 (Example) | M | A | A | Example | A | A | Example | A | A | Reference example | A | A | Reference example |
| 4 (Example) | M | A | A | Example | A | A | Example | A | A | Reference example | A | A | Reference example |
| 5 (Example) | M | B | B | Example | A | A | Example | A | A | Reference example | A | A | Reference example |
| 6 (Example) | C | A | A | Example | A | A | Example | A | A | Reference example | A | A | Reference example |
| 7 (Example) | Y | A | A | Example | A | A | Example | A | A | Reference example | A | A | Reference example |
| 8 (Example) | M | B | B | Example | A | A | Example | A | A | Reference example | A | A | Reference example |
| 9 (Example) | M | A | A | Example | A | A | Example | A | A | Reference example | A | A | Reference example |
| 10 (Example) | M | A | A | Example | A | A | Example | A | A | Reference example | A | A | Reference example |
| 11 (Example) | M | A | A | Example | A | A | Example | A | A | Reference example | A | A | Reference example |
| 12 (Example) | M | A | A | Example | A | A | Example | A | A | Reference example | A | A | Reference example |
| 13 (Comparative example) | M | D | D | Comparative example | D | D | Comparative example | D | D | Reference example | C | C | Reference example |
| 14 (Comparative example) | M | C | C | Comparative example | C | C | Comparative example | C | C | Reference example | B | B | Reference example |

TABLE 2-continued

| 15 (Comparative example) | M | C | A | Comparative example | C | A | Comparative example | C | A | Reference example | C | A | Reference example |
|---|---|---|---|---|---|---|---|---|---|---|---|---|---|
| 16 (Comparative example) | M | C | A | Comparative example | C | A | Comparative example | C | A | Reference example | C | A | Reference example |

A: Color transfer to the adhesive tape was not observed and image peeling of the sample was also not observed.
B: Slight color transfer to the adhesive tape was observed and it was also possible to observe slight image peeling of the sample.
C: A fair degree of color transfer to the adhesive tape was observed and it was also possible to easily observe image peeling of the sample.
D: Color transfer of the image of the sample to the adhesive tape occurred over the entire surface, and image peeling of the sample occurred.

As shown in Table 2, in the Examples set so as to be UV cured at a predetermined illuminance after the image was formed by using the ink containing the polyvalent (meth) acrylamide at a predetermined ratio, compared to the examples given for comparison, a good curing property was obtained and an image with an excellent adhesion property was formed while suppressing the generation of gloss unevenness even at low illuminance.

This application claims priority under 35 U.S.C. §119 of Japanese Patent application JP 2012-039232, filed on Feb. 24, 2012 and Japanese Patent application JP 2012-287915, filed on Dec. 28, 2012, the entire contents of which are hereby incorporated by reference.

What is claimed is:

1. An image forming method comprising:
applying an ink composition, which includes at least a pigment, water, and a polymerizable compound of 15 mass % or more and 35 mass % or less with respect to the entire ink composition, to a coated paper having a pigment layer on at least one surface of a support in which cellulose pulp is a main component, using an ink jet method;
at least drying the applied ink composition; and
curing the ink composition on the coated paper by irradiating active energy rays at an illuminance of 1 W/cm² or more and 2 W/cm² or less to the ink composition which has undergone drying processing,
wherein a polyvalent (meth)acrylamide of 5 mass % or more and 10 mass % or less with respect to the entire ink composition, and a monofunctional (meth)acrylamide are included as the polymerizable compound.

2. The image forming method according to claim 1, wherein the polyvalent (meth)acrylamide is a compound represented by the following General Formula (1),

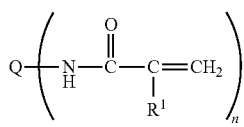

General Formula (1)

wherein Q represents an n-valent linking group, $R^1$ represents a hydrogen atom or a methyl group, and n is an integer of two or more.

3. The image forming method according to claim 2, wherein the pigment is a water-dispersible pigment in which at least a part of a surface thereof is coated with a polymeric dispersing agent.

4. The image forming method according to claim 3, wherein the polyvalent (meth)acrylamide is a trivalent or higher (meth)acrylamide.

5. The image forming method according to claim 4, further comprising:
applying a treatment liquid, which includes an aggregation component capable of aggregating components in the ink composition, to the coated paper, prior to drying processing.

6. The image forming method according to claim 5, wherein at least one of the ink composition and the treatment liquid further includes a polymerization initiator.

7. The image forming method according to claim 6, wherein at least one type of the polymerization initiator is 1-[4-(2-hydroxyethoxy)-phenyl]-2-hydroxy-2-methyl-1-propan-1-one.

8. The image forming method according to claim 7, wherein the ink composition includes polymer particles, and a content of the polymer particles in the ink composition is 1 mass % or more and 3 mass % or less by solid content concentration.

9. The image forming method according to claim 8, wherein the ink composition is applied to the coat paper with a maximum application amount of 15 ml/m² or less.

10. The image forming method according to claim 9, wherein the ink composition includes a surfactant.

11. The image forming method according to claim 1, wherein the pigment is a water-dispersible pigment in which at least a part of a surface thereof is coated with a polymeric dispersing agent.

12. The image forming method according to claim 1, wherein the polyvalent (meth)acrylamide is a trivalent or higher (meth)acrylamide.

13. The image forming method according to claim 1, further comprising:
applying a treatment liquid, which includes an aggregation component capable of aggregating components in the ink composition, to the coated paper, prior to drying processing.

14. The image forming method according to claim 13, wherein at least one of the ink composition and the treatment liquid further includes a polymerization initiator.

15. The image forming method according to claim 14, wherein at least one type of the polymerization initiator is 1-[4-(2-hydroxyethoxy)-phenyl]-2-hydroxy-2-methyl-1-propan-1-one.

16. The image forming method according to claim 1, wherein the ink composition includes polymer particles, and a content of the polymer particles in the ink composition is 1 mass % or more and 3 mass % or less by solid content concentration.

17. The image forming method according to claim 1, wherein the ink composition is applied to the coat paper with a maximum application amount of 15 ml/m² or less.

18. The image forming method according to claim 1, wherein the ink composition includes a surfactant.

19. The image forming method according to claim 1, wherein the monofunctional (meth)acrylamide is at least one compound selected from the following compounds:

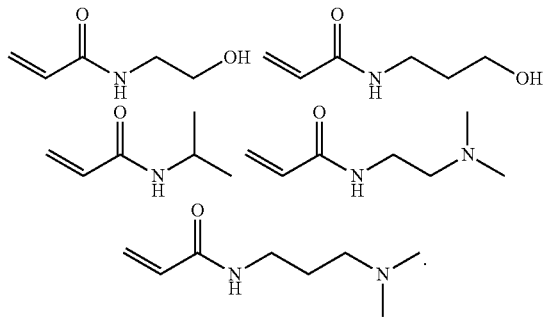

20. The image forming method according to claim 1, wherein the polyvalent (meth)acrylamide is a compound represented by the following General Formula (2), General Formula (2)

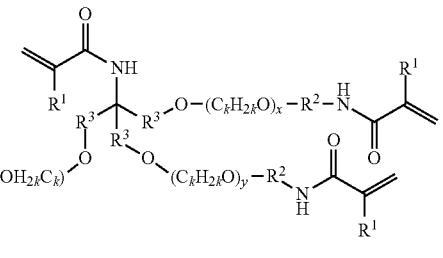

wherein $R^1$ represents a hydrogen atom or a methyl group, $R^2$ represents a linear or branched alkylene group having 2 to 4 carbon atoms, $R^3$ represents a divalent linking group, and a plurality of $R^3$ may be the same or different from each other, k represents 2 or 3, and a plurality of k may be the same or different from each other, and x, y, and z each independently represent integers of 0 to 6.

* * * * *